US011397423B2

(12) United States Patent
Oonishi

(10) Patent No.: US 11,397,423 B2
(45) Date of Patent: Jul. 26, 2022

(54) CONTROL SYSTEM

(71) Applicant: FANUC CORPORATION, Yamanashi (JP)

(72) Inventor: Nobuhito Oonishi, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 17/096,408

(22) Filed: Nov. 12, 2020

(65) Prior Publication Data
US 2021/0165392 A1 Jun. 3, 2021

(30) Foreign Application Priority Data

Dec. 2, 2019 (JP) .............................. JP2019-217979

(51) Int. Cl.
G05B 19/418 (2006.01)

(52) U.S. Cl.
CPC ..... *G05B 19/4183* (2013.01); *G05B 19/4187* (2013.01); *G05B 19/41805* (2013.01); *G05B 19/41875* (2013.01)

(58) Field of Classification Search
CPC ...... G05B 19/4183; G05B 2219/37237; G05B 2219/49153; G05B 2219/35316; G05B 2219/35317; G05B 2219/36265
(Continued)

(56) References Cited

U.S. PATENT DOCUMENTS 5,904,745 A * 5/1999 Nafziger ................. C03B 9/453
700/158
2008/0058982 A1* 3/2008 Gray ...................... G05B 19/19
409/80
(Continued)

FOREIGN PATENT DOCUMENTS

| CA | 2920046 | * | 7/2019 |
| JP | 09081776 | * | 3/1997 |
| JP | 2000-284819 | | 10/2000 |

OTHER PUBLICATIONS

Kitamura et al. Interference Detection Among Objects for Operator Assistance in Virtual Cooperative Workspace, 1993, IEEE, p. 442-447. (Year: 1993).*

*Primary Examiner* — Hien D Khuu
(74) *Attorney, Agent, or Firm* — Wenderoth, Lind & Ponack, L.L.P.

(57) ABSTRACT

In a control system, a node information notification portion identifies a selectable node including a machine constituent element as an interference article, and notifies an interference checker of node information relating to the node identified, in which an interference article setting unit acquires the node information, and sets the interference article based on a shape, a selection node, and a position and/or posture on a node, in which a transformation information calculation portion acquires information relating to the interference article, and derives a calculation formula for a position and/or posture of the selection node, in which an interference article position and posture calculation portion calculates the position and/or posture of the selection node, and calculates the position and/or posture of the interference article in a machine tool, and in which the interference checker checks whether there is an interference based on the position and/or posture of the interference article.

2 Claims, 24 Drawing Sheets

(58) Field of Classification Search
USPC .......................................................... 700/178
See application file for complete search history.

(56) References Cited

U.S. PATENT DOCUMENTS

| | | | |
|---|---|---|---|
| 2010/0251185 A1* | 9/2010 | Pattenden | A63F 13/577 |
| | | | 715/849 |
| 2014/0025192 A1* | 1/2014 | Seya | G05B 19/4069 |
| | | | 700/174 |
| 2016/0332297 A1* | 11/2016 | Sugaya | B25J 9/161 |
| 2018/0164782 A1* | 6/2018 | Koga | G05B 19/19 |
| 2018/0217574 A1* | 8/2018 | Oonishi | G05B 19/27 |
| 2019/0005725 A1* | 1/2019 | Oonishi | G06F 30/20 |

* cited by examiner

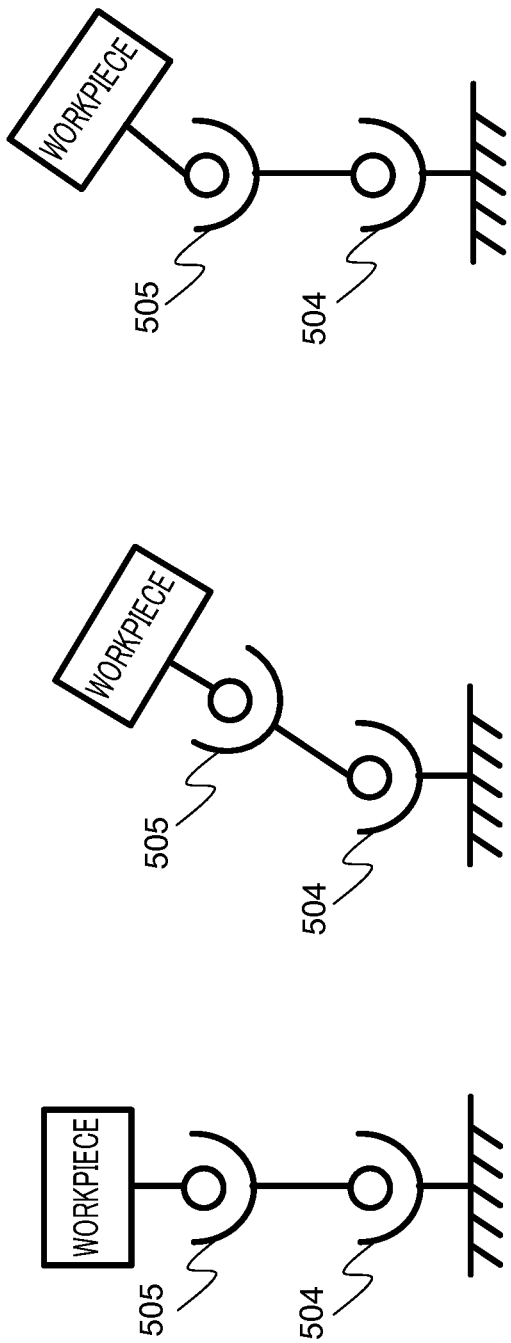

MACHINE CONFIGURATION

MACHINE CONFIGURATION TREE

CONTROL SYSTEM

This application is based on and claims the benefit of priority from Japanese Patent Application No. 2019-217979, filed on 2 Dec. 2019, the content of which is incorporated herein by reference.

BACKGROUND OF THE INVENTION

Field of the Invention

The present invention relates to a control system.

Related Art

For interference check in a numerical control device, it is necessary to set information relating to an interference article in a machine tool in order to check whether a tool interferes with an interference article. In setting the information relating to the interference article, the shape of the interference article, the position of the interference article, and the movement of the interference article with respect to the axial movement are defined.

As a technique relating to interference check using three dimensional space data, for example, there is a technique in which a tool of a machine tool and each part of a workpiece, etc. are expressed by the three dimensional space data with a three-dimensional expression method, a machinable attribute or an unmachinable attribute is individually added to each constituent element of the three dimensional space data, and, in the interference check using the three dimensional space data, it is determined that an interference is acceptable only when constituent elements to which the machinable attribute is added interfere with each other, and otherwise, an interference is a collision that should be avoided (for example, refer to Japanese Unexamined Patent Application, Publication, No. 2000-284819.

Patent Document 1: Japanese Unexamined Patent Application, Publication No. 2000-284819

SUMMARY OF THE INVENTION

However, for the operation definition relating to the position of an interference article or an axis in the interference check, for example, it is necessary to define the axis number of each linear axis, the axis number of each rotary axis, the direction of the rotary center axis of each rotary axis, the slope angle of each rotary axis, the position of the rotary center axis of each rotary axis, the rotational direction of each rotary axis, etc., which is cumbersome.

Therefore, it is desirable to enable an operation definition relating to the position of an interference article and an axis in interference check with simple work.

An aspect of the present disclosure relates to a control system including: a controller configured to control an industrial machine as a control target; a machine configuration management device configured to express a machine constituent element constituting the industrial machine as a node in a graphical form, the machine configuration management device including a node information notification portion and a transformation information calculation portion; and an interference checker configured to perform interference check between machine constituent elements, the interference checker including an interference article setting portion, an interference article position-posture calculation portion, and an interference check portion, in which the node information notification portion identifies a selectable node including a machine constituent element as an interference article, and notifies the interference checker of node information relating to the node identified, in which the interference article setting unit acquires the node information, and sets the interference article based on a shape, a selection node, and a position and/or posture on a node, in which the transformation information calculation portion acquires information relating to the interference article set by the interference article setting portion, and derives a calculation formula for a position and/or posture of the selection node, in which the interference article position-posture calculation portion calculates the position and/or posture of the selection node based on a coordinate value of each axis of the industrial machine, and calculates the position and/or posture of the interference article in a machine tool based on the position and/or posture of the selection node and the position and/or posture on the selection node of the interference article, and in which the interference checker checks whether there is an interference based on the position and/or posture of the interference article.

According to an aspect of the present disclosure, it is possible to enable an operation definition relating to the position of an interference article and an axis in interference check with simple work.

BRIEF DESCRIPTION OF THE DRAWINGS

FIG. 9A is an illustrative diagram of a parent-child relationship of the constituent elements of a machine in the embodiment of the present invention;

DETAILED DESCRIPTION OF THE INVENTION

1. Configuration of Control System

Figure 1:
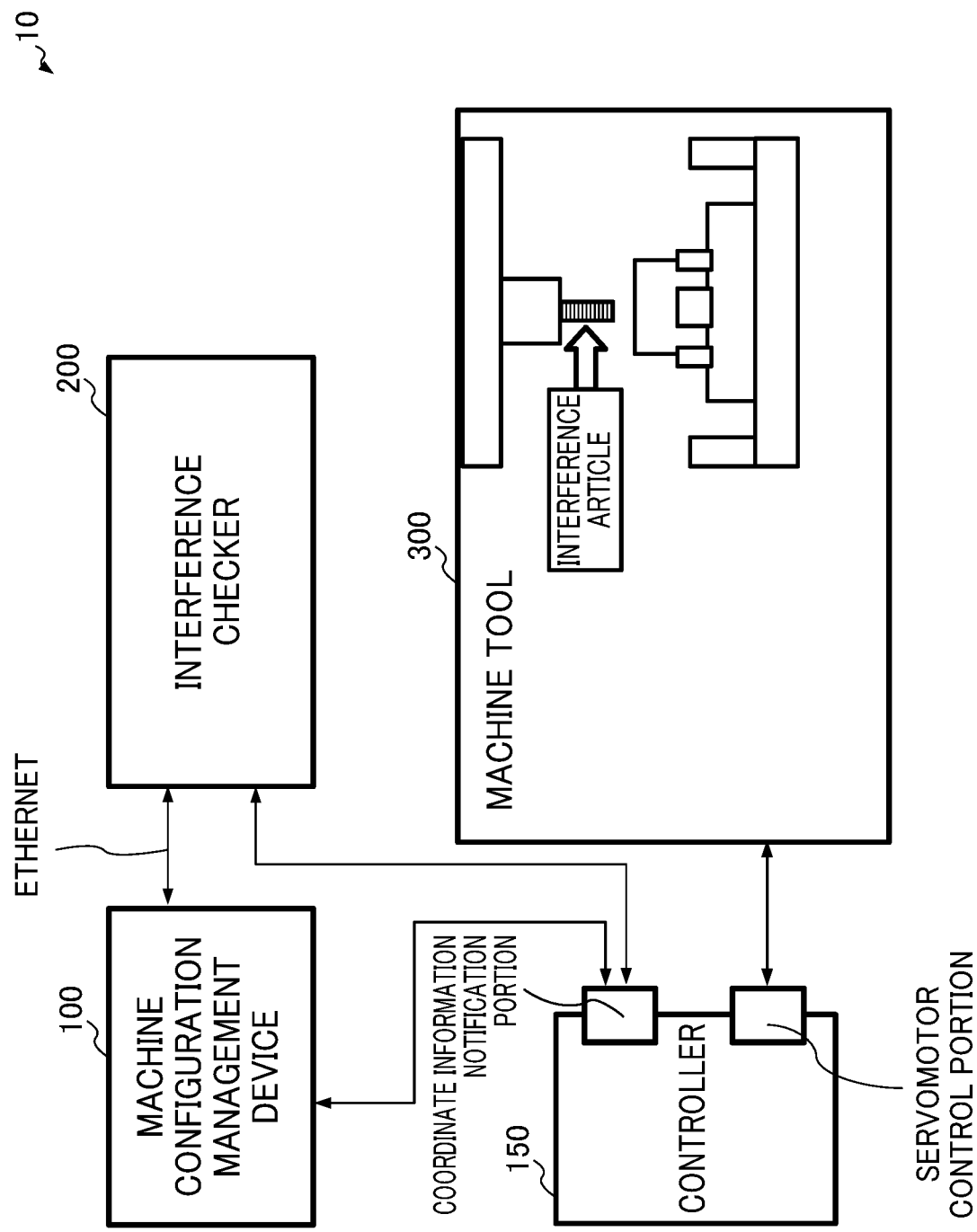
FIG. 1 is a block diagram showing a basic configuration of an entire embodiment of the present invention.

An embodiment of the present invention will then be described in detail with reference to drawings. The configuration of the entire present embodiment will first be described with reference to FIG. 1.

A control system 10 according to the present embodiment includes a machine configuration management device 100, a controller 150, an interference checker 200, and a machine tool 300.

The machine configuration management device 100 is a device specific to the present embodiment, produces a graph (hereinafter also referred to as the "machine configuration tree") in which the constituent elements of the machine tool 300 are nodes and uses the graph to manage a machine configuration, and thus the interference checker 200 which will be described later can perform interference check by utilization of data of the machine configuration based on the machine configuration tree.

More specifically, the machine configuration management device 100 uses a method described in <5. Generation of Machine Configuration Tree> which will be described later so as to generate the machine configuration tree representing the configuration of the machine tool 300. Since the machine configuration tree has mutual position relationship information of the individual nodes, the interference article is included on the machine configuration tree, and thus in the interference checker 200 which will be described later, for all the nodes on the machine configuration tree, the relationship of position/posture with the interference articles is found. The detailed configuration of the machine configuration management device 100 will be described later with reference to FIG. 2.

The controller 150 is a device which has a function as a general numerical controller and a function of communicating with the machine configuration management device 100. The controller 150 is connected to the machine tool 300 so as to be able to communicate therewith. The controller 150 uses the amounts of movement of individual control axes output based on a machining program incorporated in the controller 150 itself and thereby controls the machine tool 300 so as to machine a workpiece.

The controller 150 outputs, to the interference checker 200, the amounts of movement of the individual control axes output based on the machining program. As described above, the controller 150 outputs the amounts of movement both to the machine configuration management device 100 and the machine tool 300. In this point, the output of the amounts of movement from the controller 150 to the machine configuration management device 100 may be performed in synchronization with or asynchronously with the output of the amounts of movement from the controller 150 to the machine tool 300. The detailed configuration of the controller 150 will be described later with reference to FIG. 3.

The interference checker 200 is a device specific to the present embodiment, and calculates the position and/or posture of an interference article on the machine configuration tree, and thereby performs interference check appropriately. The detailed configuration of the interference checker 200 will be described later with reference to FIG. 4.

The machine tool 300 is a general machine tool, and moves/rotates the individual control axes according to the amounts of movement of the individual control axes output from the controller 150.

In the present embodiment, an operation definition for the position of an interference article or an axis in the machine tool 300 in interference check is facilitated with such a configuration.

The configuration shown in FIG. 1 is simply an example. For example, part or the entirety of the functions of the machine configuration management device 100 may be incorporated in the controller 150. Furthermore, part or the entirety of the functions of the interference checker 200 may be incorporated in the controller 150. Although the interference checker 200 may be realized by a single device, the interference checker 200 may be realized by a combination of a plurality of devices. Although the interference checker 200 may be realized by a device installed in the vicinity of the controller 150 or the machine tool 300, the interference checker 200 may be realized by a server device or the like installed far away from the controller 150 or the machine tool 300 through a network. Furthermore, individual communication connections may be wired connection or wireless connection.

For example, although in the figure, an example where the communication connections of the machine configuration management device 100, the controller 150 and the interference checker 200 are performed by wired connection in conformity with Ethernet (registered trade mark) is shown, the connections may be wireless connections.

2. Configuration of Machine Configuration Management Device

Figure 2:
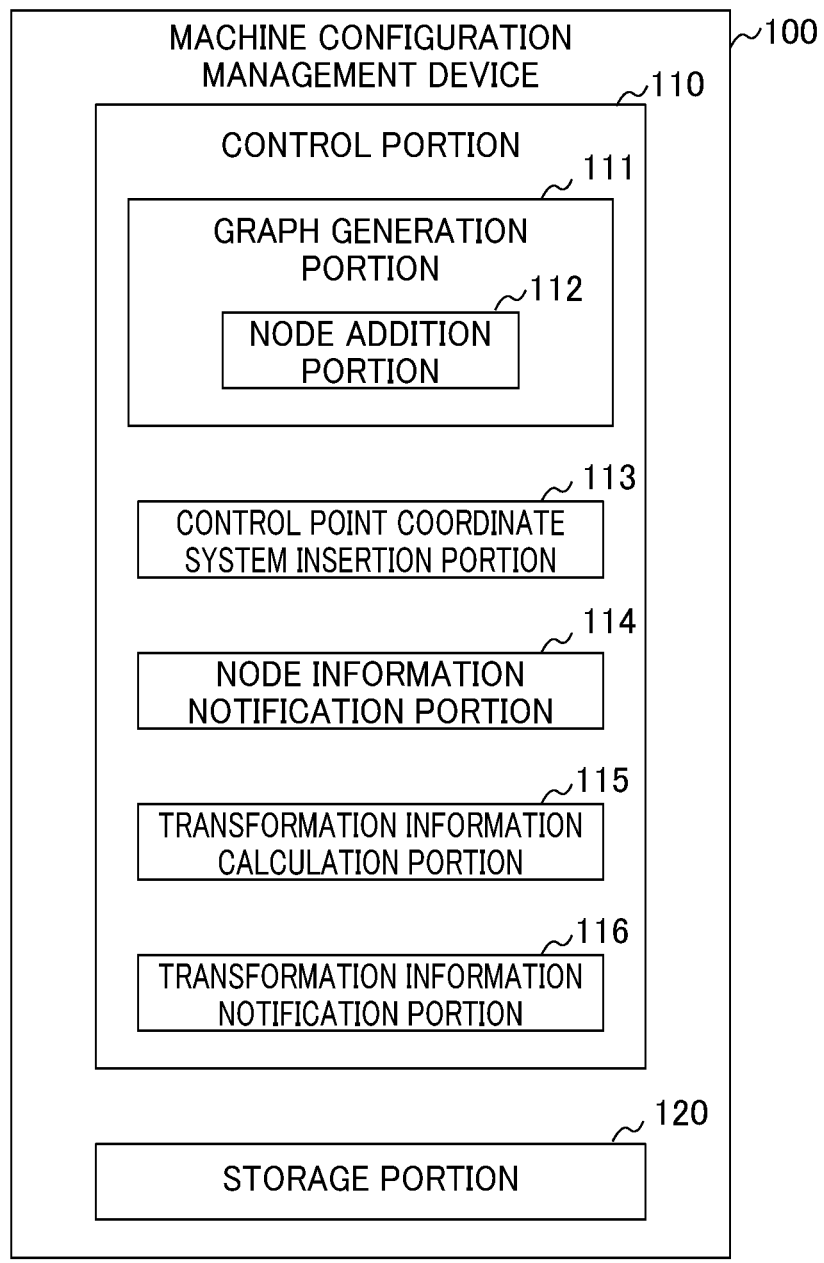
FIG. 2 is a functional block diagram of a machine configuration management device 100 according to the embodiment of the present invention.

FIG. 2 is a functional block diagram of the machine configuration management device 100. The machine configuration management device 100 includes a control portion 110 and a storage portion 120, the control portion 110 includes a graph generation portion 111, a control point coordinate system insertion portion 113, a node information notification portion 114, a transformation information calculation portion 115 and a transformation information notification portion 116 and the graph generation portion 111 includes a node addition portion 112.

The control portion 110 is a processor which comprehensively controls the machine configuration management device 100. The control portion 110 reads, through a bus, a system program and an application program stored in a ROM (not shown), and realizes, according to the system program and the application program, the functions of the graph generation portion 111, the node addition portion 112, the control point coordinate system insertion portion 113, the node information notification portion 114, the transformation information calculation portion 115 and the transformation information notification portion 116 included in the control portion 110.

The graph generation portion 111 generates, in a graphical form, the machine configuration of the machine tool 300. Furthermore, the node addition portion 112 included in the graph generation portion 111 adds nodes to the generated graph. The detailed operation thereof will be described in detail in "5. Generation of machine configuration tree" below.

The control point coordinate system insertion portion 113 inserts a control point and a coordinate system into the graph of the machine configuration. The detailed operations thereof will be described in detail in "6. Automatic insertion of control point and coordinate value" below.

The node information notification portion 114 notifies the interference checker 200 of information of nodes which can be selected as a node for carrying an interference article.

As will be described later, the transformation information calculation portion 115 receives a notification of a selection node from a selection node notification portion 212 of the interference checker 200, and thereafter calculates transformation information for calculating the position and/or posture of each node. The transformation information includes, as a variable, a coordinate value of each axis indicating the movement of each node according to the coordinate values of each axis based on the above graph. The transformation information described above may have a matrix form, a vector form or a roll-pitch-yaw form. The detailed operation thereof will be described in detail in "7. Calculation of transformation information" below.

The transformation information notification portion 116 notifies the transformation information calculated by the transformation information calculation portion 115 to a coordinate information transformation portion 213 of the interference checker 200.

The storage portion 120 stores information on the machine configuration tree generated by the graph generation portion 111.

The detailed operations of the graph generation portion 111, the node information notification portion 114, the transformation information calculation portion 115, the transformation information notification portion 116 and the storage portion 120 will be described in detail in "7. Calculation of transformation information" and "8. Interference check method" below.

3. Configuration of Controller

Figure 3:
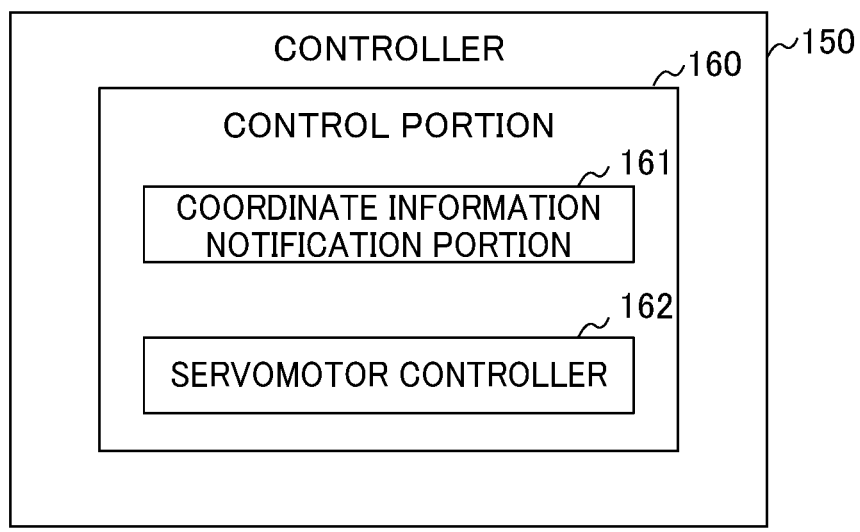
FIG. 3 is a functional block diagram of a controller 150 according to the embodiment of the present invention.

FIG. 3 is a functional block diagram of the controller 150. The controller 150 includes a control portion 160, and the control portion 160 includes a coordinate information notification portion 161 and a servomotor control portion 162.

The control portion 160 is a processor which comprehensively controls the controller 150. The control portion 160 reads, through a bus, a system program and an application program stored in the ROM (not shown), and realizes, according to the system program and the application program, the functions of the coordinate information notification portion 161 and the servomotor control portion 162 included in the control portion 160.

The coordinate information notification portion 161 notifies coordinate information of the machine tool 300 being operated to the coordinate information transformation portion 213 of the interference checker 200. The servomotor control portion 162 receives a movement command amount of each axis from the control portion 160, and outputs the command of each axis to a servomotor (not shown).

Although the controller 150 includes other constituent elements included in a normal controller in order to perform control on the machine tool 300, the description thereof will be omitted.

4. Configuration of Interference Checker

Figure 4:
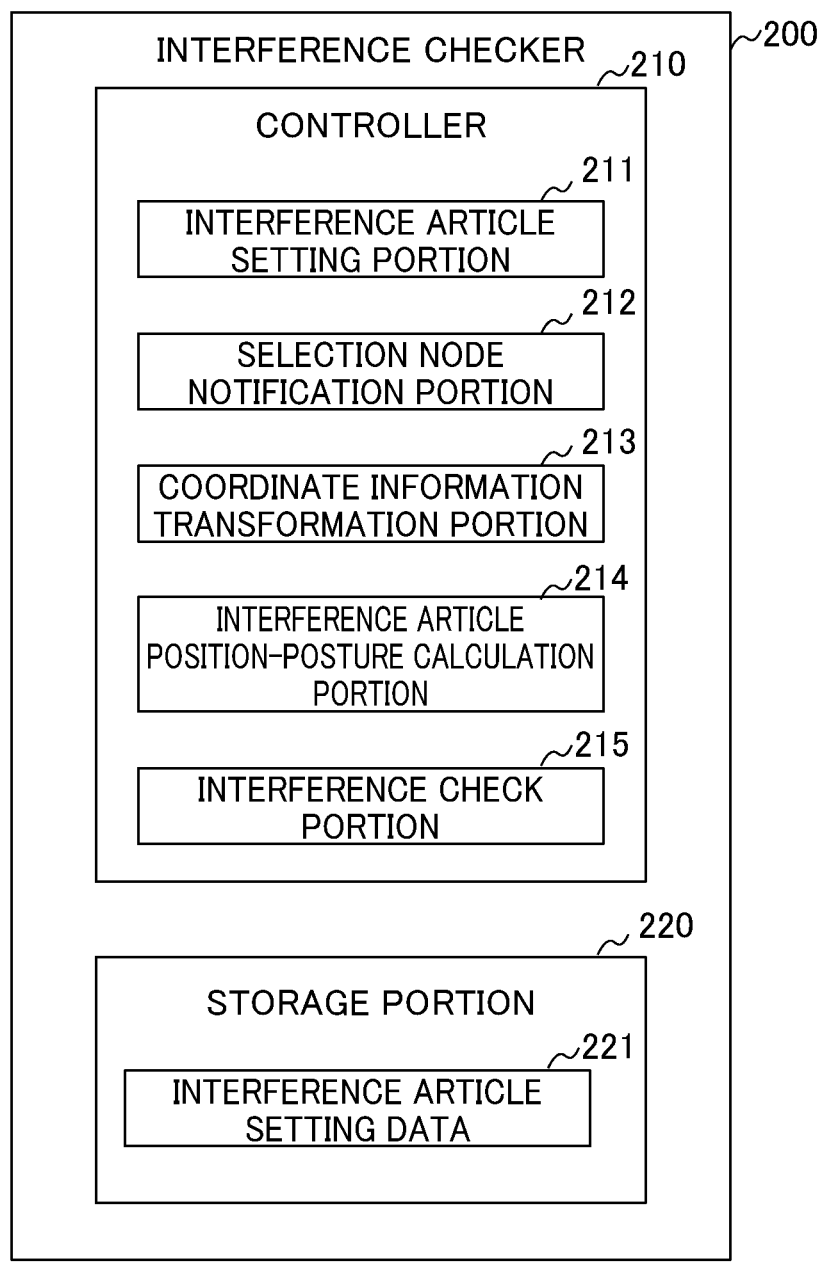
FIG. 4 is a functional block diagram of an interference checker 200 according to the embodiment of the present invention.

FIG. 4 is a functional block diagram of the interference checker 200. The interference checker 200 includes a control portion 210 and a storage portion 220, and the control portion 210 includes an interference article setting portion 211, the selection node notification portion 212, the coordinate information transformation portion 213, an interference article position-posture calculation portion 214, and an interference check portion 215.

The control portion 210 is a processor which comprehensively controls the interference checker 200. The control portion 210 reads, through a bus, a system program and an application program stored in the ROM (not shown), and realizes, according to the system program and the application program, the functions of the interference article setting portion 211, the selection node notification portion 212, the coordinate information transformation portion 213, the interference article position-posture calculation portion 214, and the interference check portion 215 included in the control portion 210.

The interference article setting portion 211 sets the shape of an interference article, a selection node carrying the interference article, and the position and/or posture of the interference article on the selection node. For example, the interference article setting portion 211 can set the information using a homogeneous matrix.

The selection node notification portion 212 notifies the selection node set by the interference article setting portion 211 to the transformation information calculation portion 115 of the machine configuration management device 100.

The coordinate information transformation portion 213 calculates the position and/or the posture of the selection node of the interference article from the coordinate value of each control axis periodically received from the controller 150 based on the transformation information received from the machine configuration management device 100.

The interference position-posture calculation portion 214 calculates the position and/or posture of the interference article in the machine tool 300 based on the position and/or posture of the selection node and the position and/or posture of the interference article.

The interference check portion 215 checks whether there is an interference based on the position and/or posture of each interference article.

The storage portion 220 stores the information relating to a graph generated by the graph generation portion 111 of the machine configuration management device 100, shape data of an interference article and data relating to a selection node as interference article setting data, and data relating to the position and/or posture of the interference article on the selection node.

The detailed operations of the interference article setting portion 211, the selection node notification portion 212, the coordinate information transformation portion 213, the interference article position-posture calculation portion 214, the interference check portion 215, and the storage portion 220 will be described in detail in "8. Interference Check Method" below.

5. Generation of Machine Configuration Tree

The machine configuration management device 100 according to the embodiment of the present invention first generates the graph showing the machine configuration. A method of generating a machine configuration tree as an example of the graph will be described in detail with reference to FIGS. 5 to 11.

Figure 5:
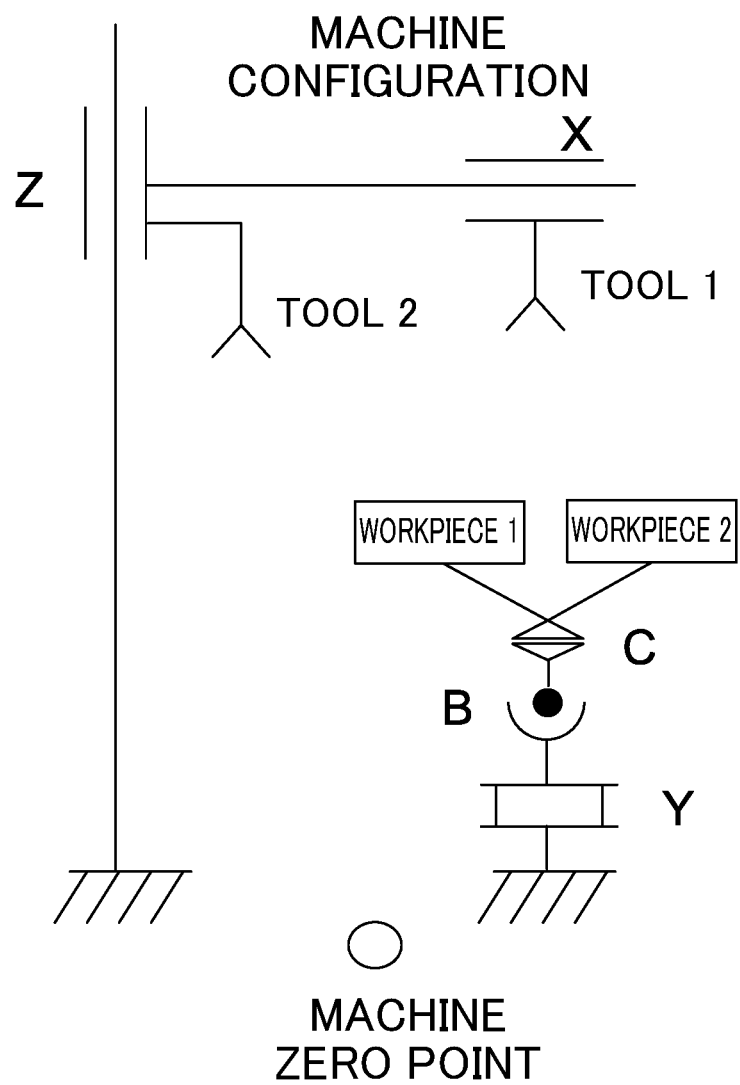
FIG. 5 is an illustrative diagram of a method of generating a machine configuration tree in the embodiment of the present invention.

As the example, the method of generating the machine configuration tree representing the configuration of a machine shown in FIG. 5 will be described. In the machine of FIG. 5, it is assumed that an X axis is set perpendicular to a Z axis, that a tool 1 is installed in the X axis and that a tool 2 is installed in the Z axis. On the other hand, it is assumed that a B axis is set on a Y axis, that a C axis is set on the B axis and that a workpiece 1 and a workpiece 2 are installed in the C axis. The method of representing the machine configuration as the machine configuration tree will be described below.

Figure 6:
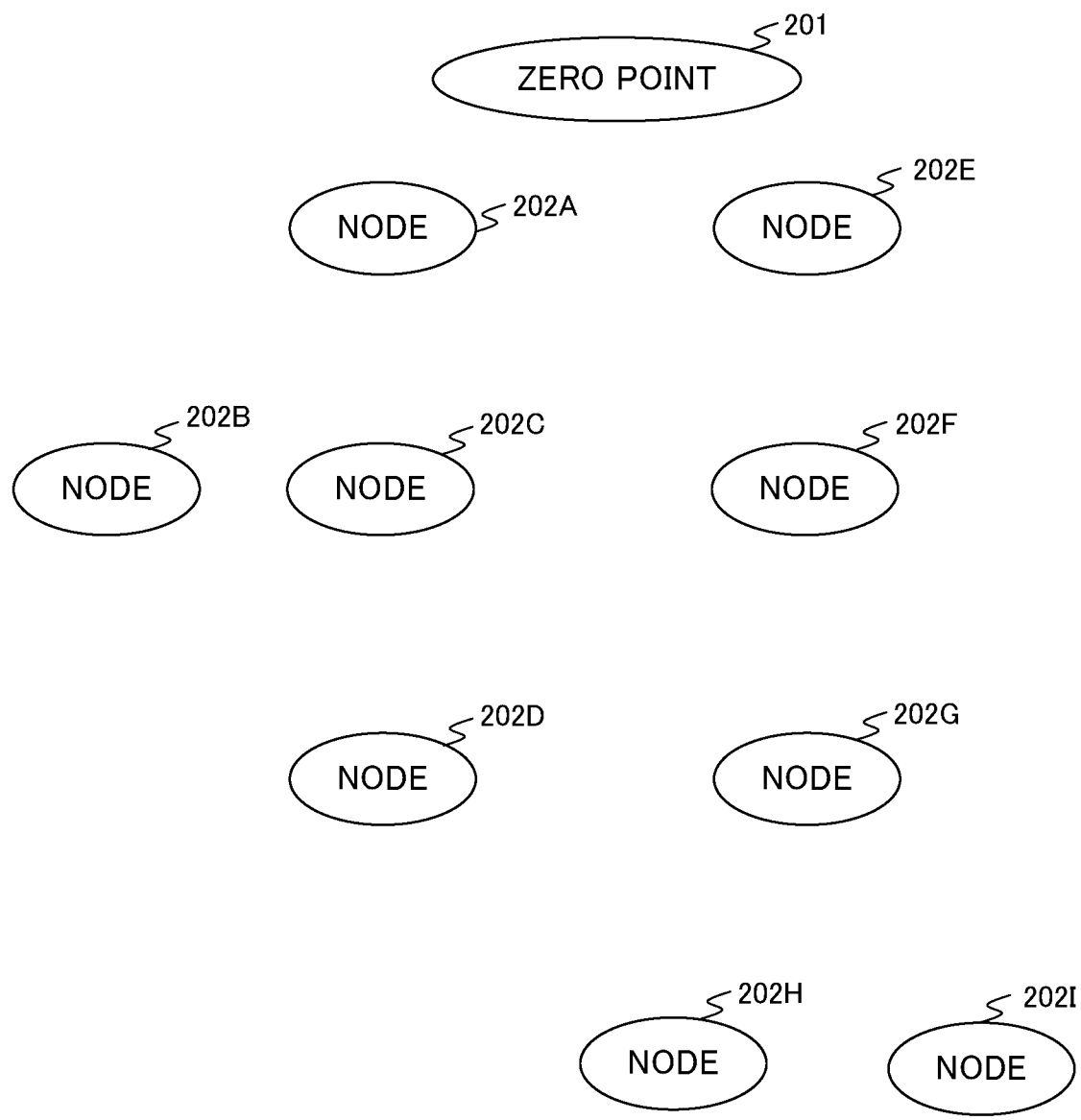
FIG. 6 is an illustrative diagram of the method of generating the machine configuration tree in the embodiment of the present invention.

First, as shown in FIG. 6, only a zero point 201 and nodes 202A to 202I are arranged. In this stage, there is no connection between the zero point 201 and the nodes 202 and between the nodes 202, and the names of the zero point and the nodes are not set.

Figure 7:
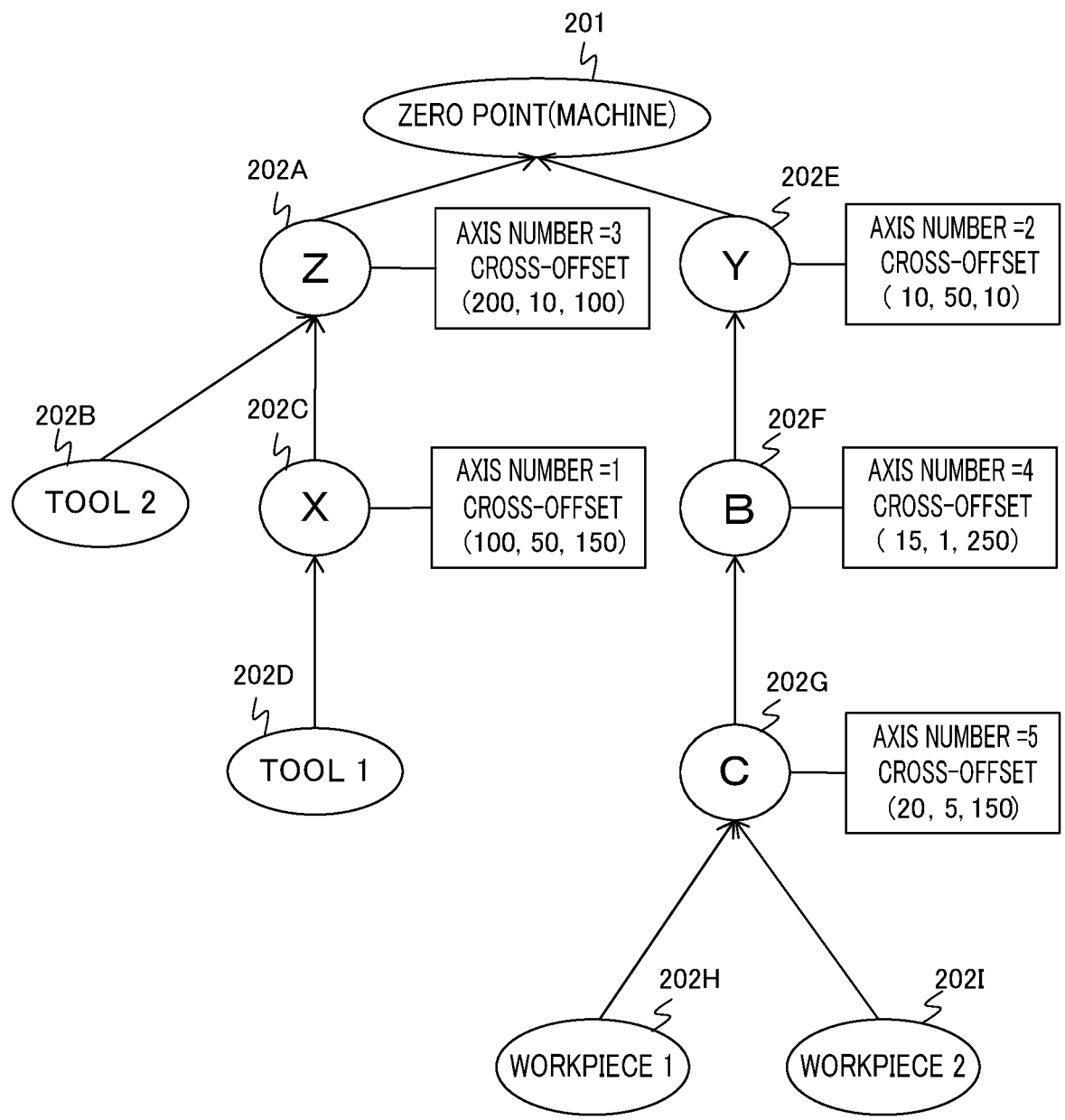
FIG. 7 is an illustrative diagram of the method of generating the machine configuration tree in the embodiment of the present invention.

Then, the axis names (axis types) of the individual axes, the names of the individual tools, the names of the individual workpieces, the names of the individual zero points and the physical axis numbers (axis types) of the individual axes are set. Then, the parent nodes (axis types) of the individual axes, the parent nodes of the individual tools and the parent nodes of the individual workpieces are set. Finally, the cross-offsets (axis types) of the individual axes, the cross-offsets of the individual tools and the cross-offsets of the individual workpieces are set. Consequently, the machine configuration tree shown in FIG. 7 is generated.

Each node of the machine configuration tree is not limited to the pieces of information described above, and it may or may not have information related to, for example, an identifier (name), the identifier of the parent node of itself, the identifiers of all child nodes whose parents are itself, a relative offset (cross-offset) with respect to the parent node, a relative coordinate value with respect to the parent node, a relative movement direction (unit vector) with respect to the parent node, node types (linear axis/rotary axis/unit (which will be described later)/control point/coordinate system/zero point and the like), the physical axis number and the transformation formulas of an orthogonal coordinate system and a physical coordinate system.

As described above, values are set to the individual nodes, and thus data which has a data structure in the shape of a machine configuration tree is generated within the machine configuration management device 100. Furthermore, even when another machine (or robot) is added, a zero point is added, and thus it is possible to further add nodes.

Figure 8:
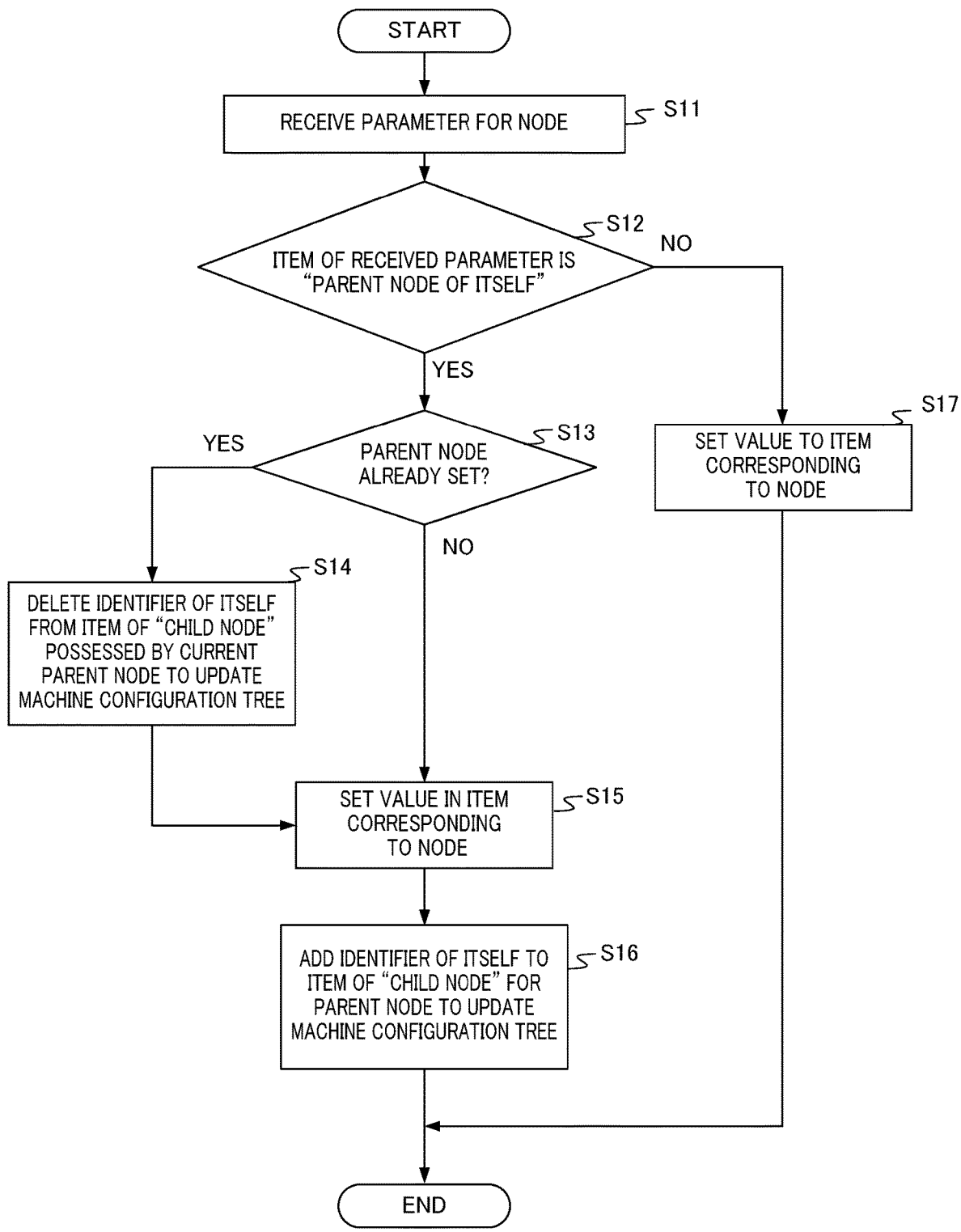
FIG. 8 is a flowchart showing the method of generating the machine configuration tree in the embodiment of the present invention.

A flowchart obtained by generalizing the method of generating the machine configuration tree described above, in particular, the method of setting the values to the individual nodes is shown in FIG. 8.

In Step S11, the graph generation portion 111 receives the value of a parameter set to the node. When in Step S12, the item of the set parameter is "parent node of itself" (yes in S12), the processing is transferred to Step S13. When the item of the set parameter is not "parent node of itself" (no in S12), the processing is transferred to Step S17.

When in Step S13, a parent node has already been set to the node to which the parameter is set (yes in S13), the processing is transferred to Step S14. When a parent node has not been set (no in S13), the processing is transferred to Step S15.

In Step S14, the graph generation portion 111 deletes the identifier of itself from the item of "child node" possessed by the current parent node of the node to which the parameter is set so as to update the machine configuration tree.

In Step S15, the graph generation portion 111 sets the value to the corresponding item of the node to which the parameter is set.

In Step S16, the graph generation portion 111 adds the identifier of itself to the item of "child node" in the parent node so as to update the machine configuration tree, and thereafter the flow is completed.

In Step S17, the graph generation portion 111 sets the value to the corresponding item of the node to which the parameter is set, and thereafter the flow is completed.

Figure 9B:
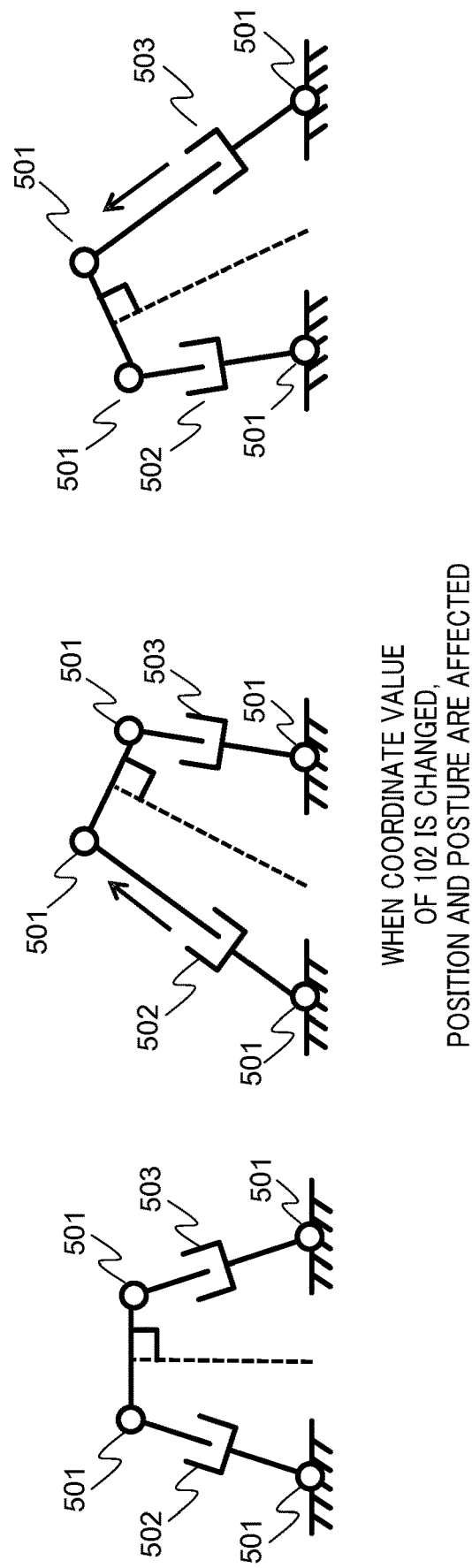
FIG. 9B is an illustrative diagram of the parent-child relationship of the constituent elements of a machine in the embodiment of the present invention.

The method of generating the data having the data structure in the shape of the machine configuration tree described above is used, and thus it is possible to set a parent-child relationship of the constituent elements of the machine. Here, the parent-child relationship refers to a relationship in which, for example, when as shown in FIG. 9A, two rotary axis nodes 504 and 505 are present, a variation in the coordinate value of the node 504 on one side unilaterally affects the geometric state (typically, the position and the posture) of the node 505 on the other side. In this case, the nodes 504 and 505 are said to have a parent-child relationship, the node 504 is referred to as a parent and the node 505 is referred to as a child. However, for example, as shown in FIG. 9B, in a machine configuration that is configured with two linear axis nodes 502 and 503 and four free joints 501, a mechanism is present in which as the coordinate value (length) of one of the nodes 502 and 503 is varied, not only the geometric state of the other node but also the geometric state of itself is varied, that is, the nodes affect each other. In such a case, both of them are parents and children, and in other words, the parent-child relationship can be regarded as being bidirectional.

Figure 10A:
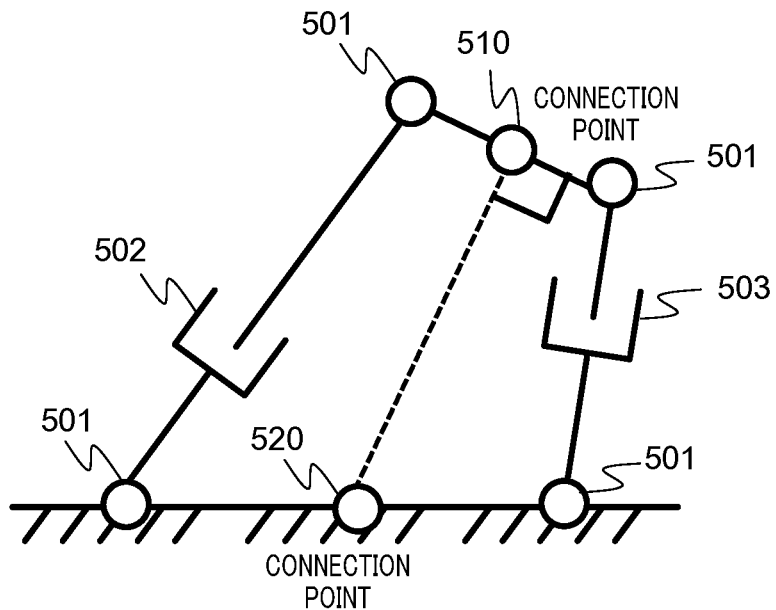
FIG. 10A is an illustrative diagram of a method of inserting a unit into the machine configuration tree.
Figure 10B:
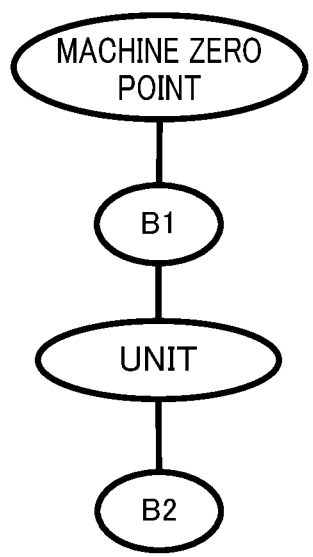
FIG. 10B is an illustrative diagram of the method of inserting the unit into the machine configuration tree.
Figure 10C:
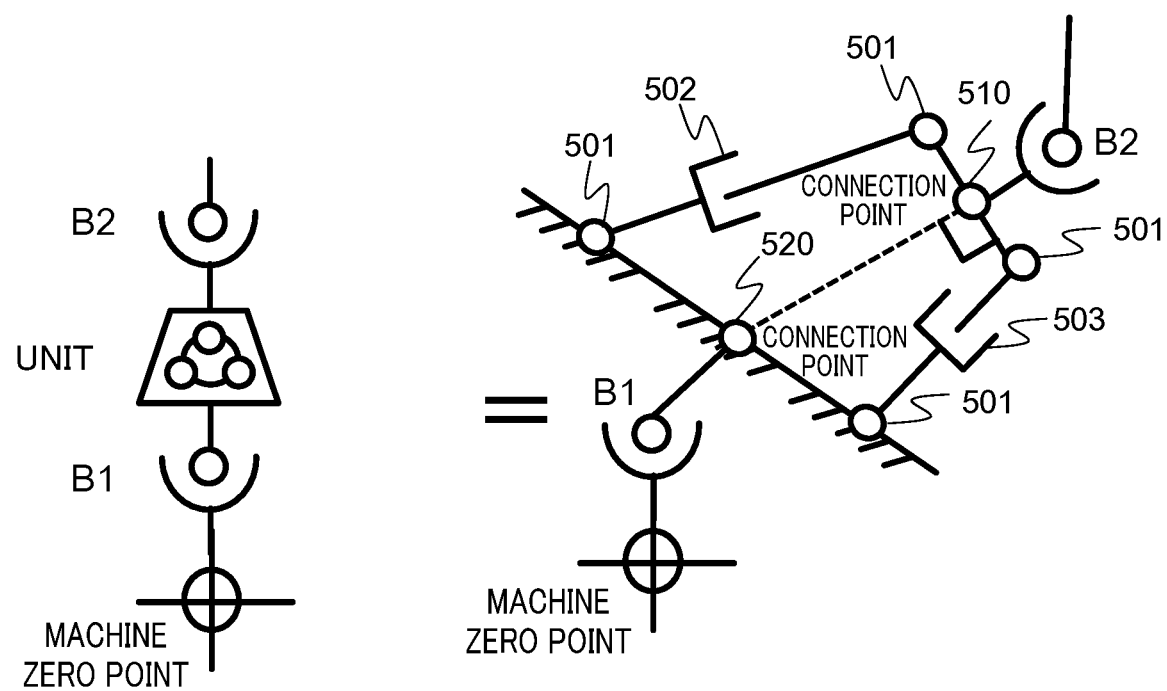
FIG. 10C is an illustrative diagram of the method of inserting the unit into the machine configuration tree.
Figure 11:
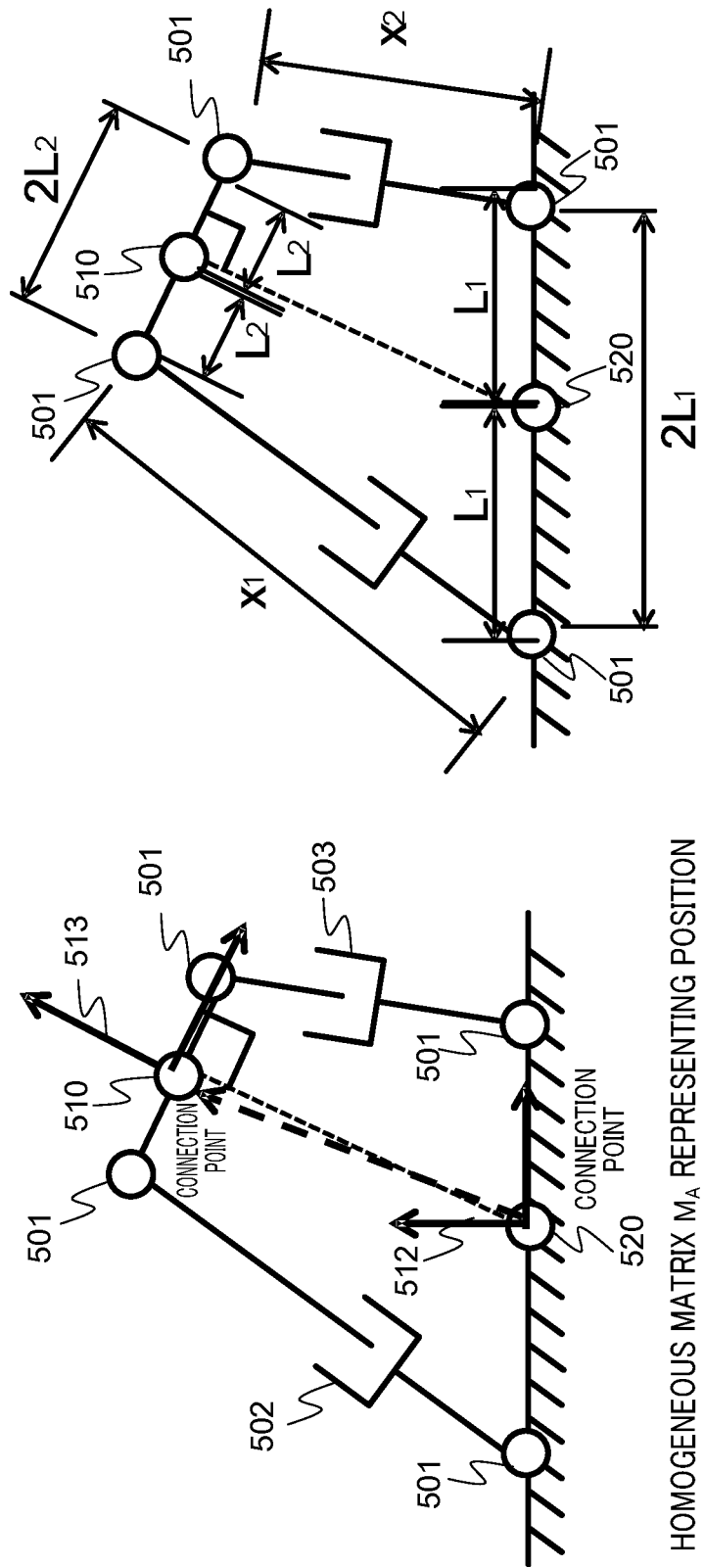
FIG. 11 is a diagram showing an example of a machine configuration according to the embodiment of the present invention.

As described above, a mechanism in which a variation in a certain node affects the other node is regarded as one unit in terms of convenience, this unit is inserted into the machine configuration tree and thus the entire machine configuration tree is generated. As shown in FIG. 10A, the unit has two connection points 510 and 520, and when the unit is inserted into the machine configuration tree as shown in FIG. 10B, as shown in FIG. 10C, the parent node is connected to the connection point 520, and the child node is connected to the connection point 510. The unit also has a transformation matrix from the connection point 520 to the connection point 510. This transformation matrix is indicated by the coordinate values of the individual nodes included in the unit. For example, in the case of a machine configuration as shown in FIG. 11, when a homogeneous matrix indicating the position and the posture of the connection point 520 is assumed to be $M_A$, and a homogeneous matrix indicating the position and the posture of the connection point 510 is assumed to be $M_B$, a transformation formula between the matrices is represented as follows by use of the coordinate values $x_1$ and $x_2$ of the linear axis nodes included in the unit.

When it is assumed [Formula 1]

$$\theta = \sin^{-1}\left(\frac{x_1^2 - x_2^2}{4L_1 L_2}\right)$$

$$L = L_1 \cos\theta + \sqrt{0.5x_1^2 + 0.5x_2^2 - L_2^2 - L_1^2 \sin^2\theta}$$

the formula is represented $$M_B = TM_A \text{ where } T = \begin{pmatrix} \sin\theta & 0 & \cos\theta & L\cos\theta \\ 0 & 1 & 0 & 0 \\ -\cos\theta & 0 & \sin\theta & L\sin\theta \\ 0 & 0 & 0 & 1 \end{pmatrix}$$

The unit indicating this machine configuration has a homogeneous transformation matrix such as T in the mathematical formula of [Formula 1] described above. The homogeneous matrix refers to a 4×4 matrix which can collectively represent the position and the posture as in the mathematical formula of [Formula 2] below.

$$\begin{pmatrix} \overbrace{\begin{array}{|ccc|} \hline \cos\theta & -\sin\theta & 0 \\ \sin\theta & \cos\theta & 0 \\ 0 & 0 & 1 \\ \hline \end{array}}^{\text{posture}} & \overbrace{\begin{array}{|c|} \hline x \\ y \\ z \\ \hline \end{array}}^{\text{position}} \\ 0 \quad 0 \quad 1 & 1 \end{pmatrix}$$ [Formula 2]

Even when the parent-child relationship is not mutual, in order for calculation processing or a setting to be simplified, a unit in which a plurality of nodes are previously integrated into one may be defined and configured into the machine configuration tree.

As described above, in the present embodiment, the graph of the machine configuration can include, as a constituent element, a unit in which a plurality of axes are integrated into one.

6. Automatic Insertion of Control Point and Coordinate System

In order to specify, as the control points, various positions on the machine configuration and set coordinate systems in various places on the machine configuration, the following method is performed by use of the machine configuration tree generated in "5. Generation of machine configuration tree" described above.

Figure 12A:
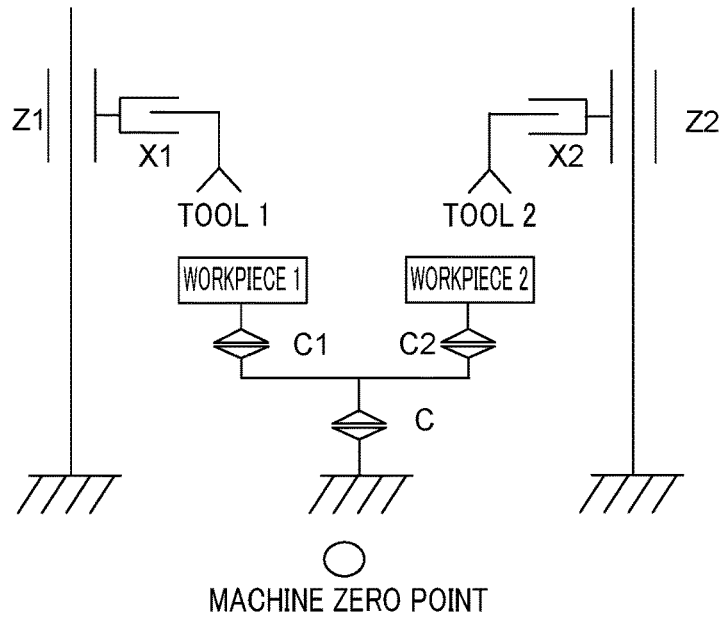
FIG. 12A is a diagram showing an example of the machine which is a target for the generation of the machine configuration tree.
Figure 12B:
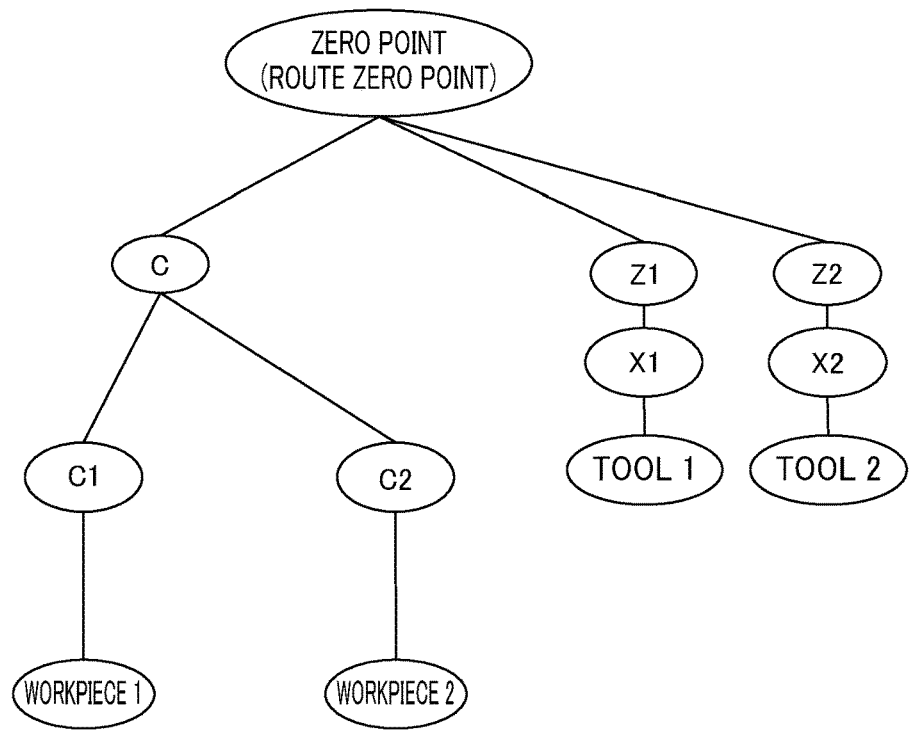
FIG. 12B is a diagram showing an example of a machine configuration tree corresponding to the machine which is the target for the generation of the machine configuration tree.

For example, in a rotary index machine 350 shown in FIG. 12A, an X1 axis is set perpendicular to a Z1 axis, and a tool 1 is installed in the X1 axis. An X2 axis is set perpendicular to a Z2 axis, and a tool 2 is installed on the X2 axis. Furthermore, it is assumed that in a table, on a C axis, a C1 axis and a C2 axis are set in parallel, and in the C1 axis and the C2 axis, a workpiece 1 and a workpiece 2 are respectively installed. When this machine configuration is represented by a machine configuration tree, the machine configuration tree shown in FIG. 12B is provided.

Figure 13:
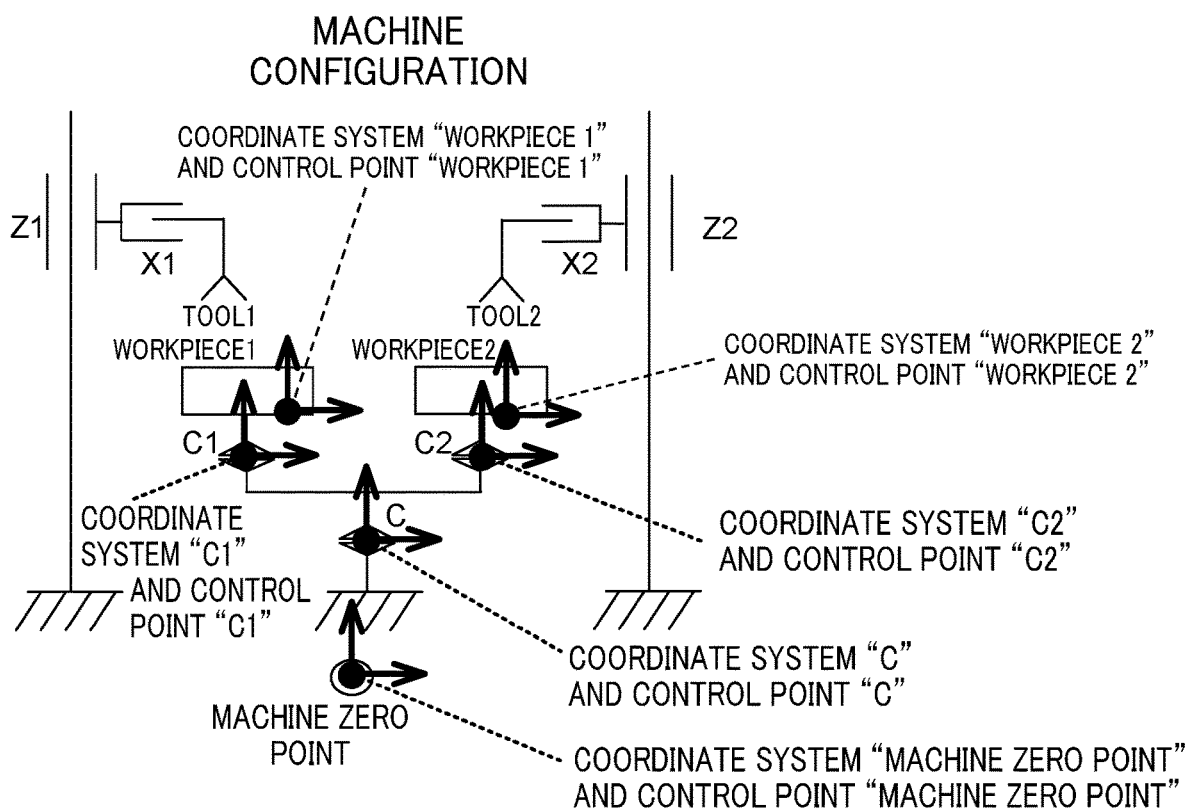
FIG. 13 is a diagram showing an example where a coordinate system and a control point are inserted into each node in the machine in the embodiment of the present invention.
Figure 14:
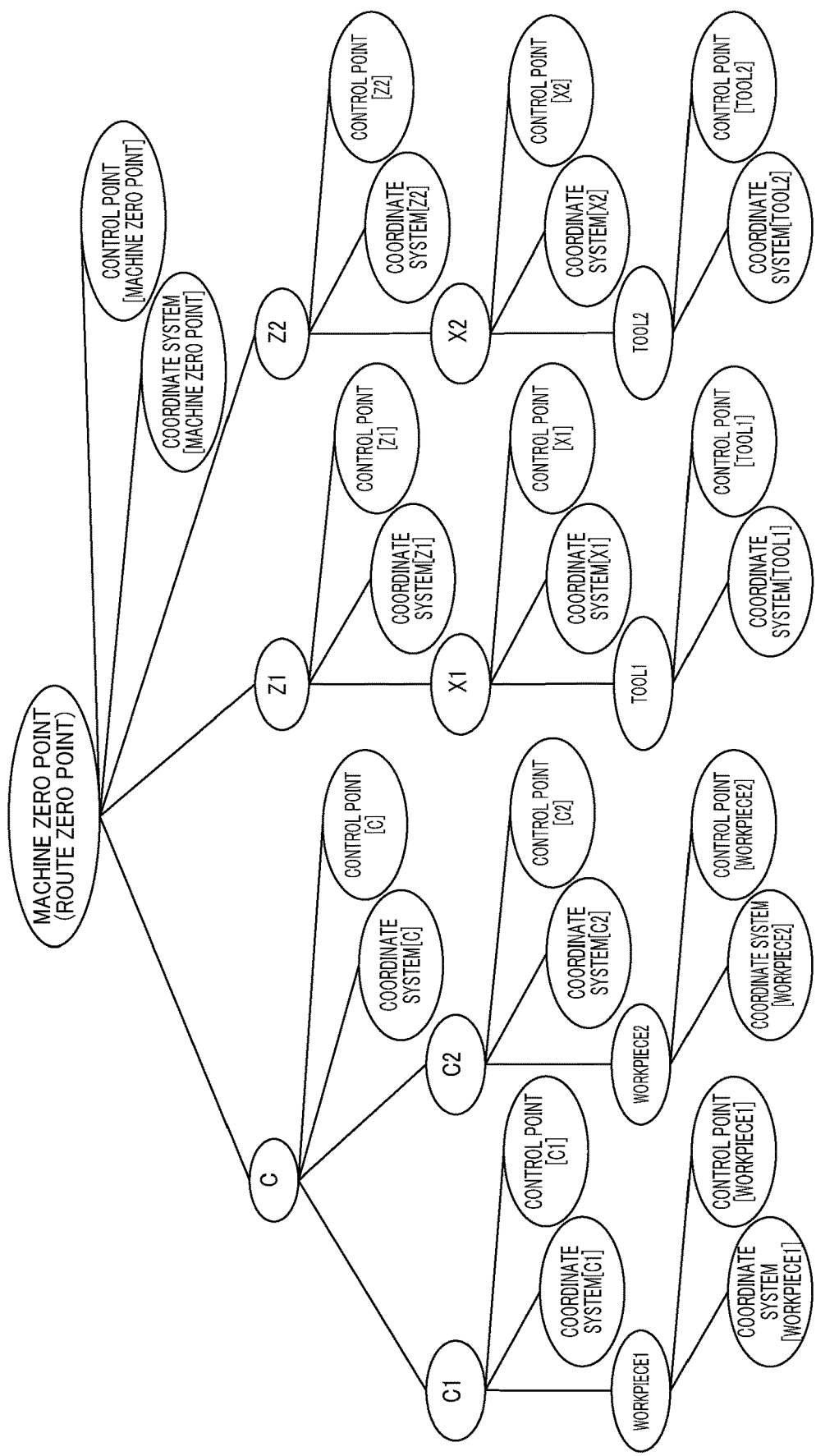
FIG. 14 is a diagram showing an example of the machine configuration tree into which the coordinate systems and the control points are inserted in the embodiment of the present invention.

In an example of a series of nodes leading from individual workpieces to the machine zero point, as shown in FIG. 13, a coordinate system and a control point are automatically inserted into each of the machine zero point, the C axis, the C1 axis, the C2 axis, the workpiece 1 and the workpiece 2. This is performed not only on the table but also on the series of nodes leading from individual tools to the machine zero point, that is, all the X1 axis, the X2 axis, the Z1 axis, the Z2 axis, the tool 1 and the tool 2. Consequently, as shown in FIG. 14, into all the nodes of the machine configuration tree, the control points and the coordinate systems corresponding to the individual nodes are automatically inserted. Normally, when machining is performed, the coordinate system is specified in the workpiece, and the tool is specified as the control point. In this way, for example, it is possible to cope with various cases such as a case where in order to move a workpiece itself to a predetermined position, the control point is desired to be specified in the workpiece and a case where in order to use a certain tool to polish another tool, the coordinate system is desired to be set in the tool itself.

Figure 15A:
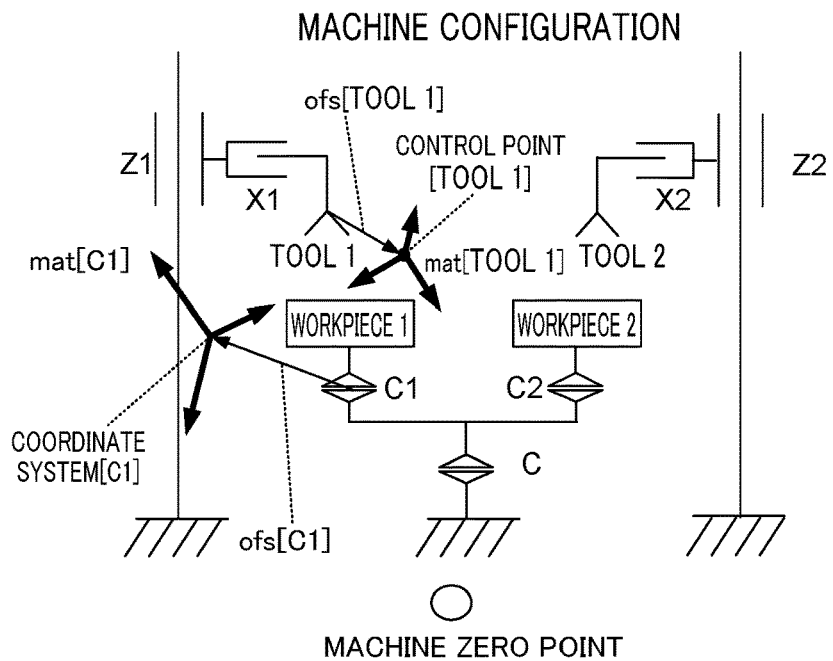
FIG. 15A is a diagram showing an example of the machine in which an offset and a posture matrix are inserted into each node in the embodiment of the present invention.
Figure 15B:
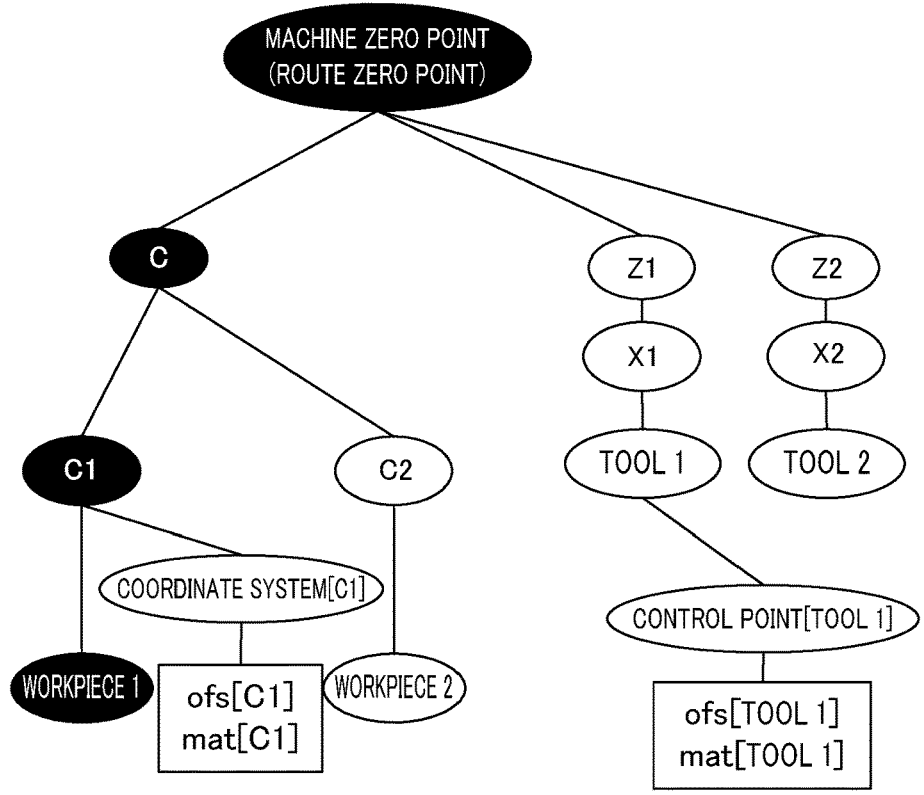
FIG. 15B is a diagram showing an example where the offset and the posture matrix are inserted into each node in the machine in the embodiment of the present invention.

As shown in FIG. 15A, each of the control points and the coordinate systems has an offset. Hence, a point away from the center of the node can be set to a control point or a coordinate system zero point. Furthermore, each of the control points and the coordinate systems has a posture matrix. When this posture matrix is the posture matrix of the control point, it indicates the posture (the direction, the inclination) of the control point whereas when this posture matrix is the posture matrix of the coordinate system, it indicates the posture of the coordinate system. In a machine configuration tree shown in FIG. 15B, the offset and the posture matrix are represented so as to be associated with the nodes corresponding thereto. Furthermore, each of the control points and the coordinate systems has information on whether or not the "move" and the "cross-offset" of the node present on a path up to the route of the machine configuration tree are individually added, and the information can be set.

Figure 16:
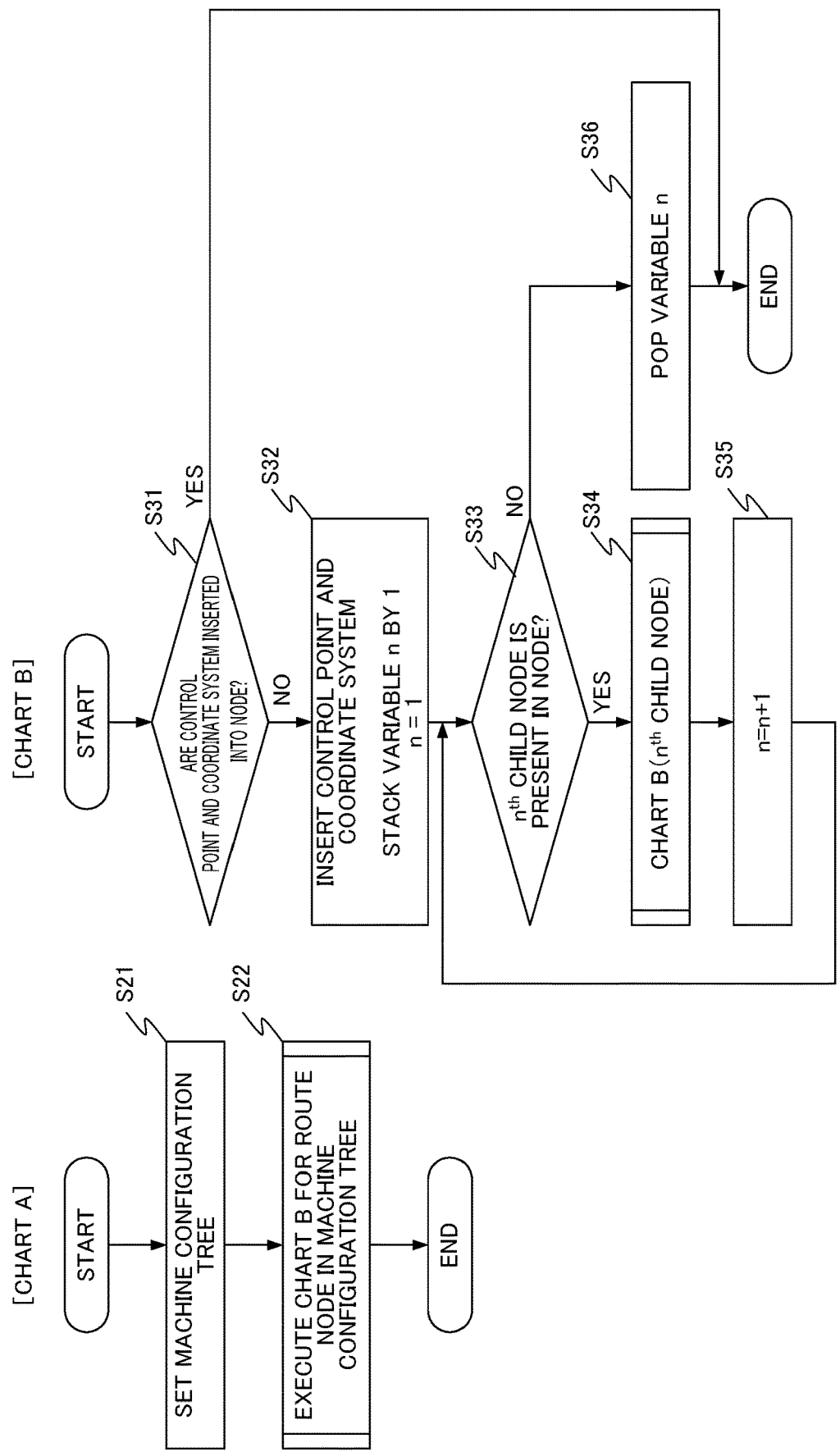
FIG. 16 is a diagram showing an operation flow of inserting the control point into the machine configuration tree in the embodiment of the present invention.

A flowchart obtained by generalizing the method of automatically inserting the control point described above is shown in FIG. 16. Specifically, this flowchart includes a chart A and a chart B, and as will be described later, the chart B is performed in the middle of the chart A.

The chart A will first be described. In Step S21, the graph generation portion 111 sets a machine configuration tree. In Step S22, the chart B is performed, and the flow of the chart A is completed.

The chart B will then be described. In Step S31 of the chart B, when the control point and the coordinate system have been inserted into the node (yes in S31), the flow is completed. When the control point and the coordinate system have not been inserted into the node (no in S31), the processing is transferred to Step S32.

In Step S32, the control point coordinate system insertion portion 113 inserts the control point and the coordinate system into the node, and stacks a variable n by 1. A setting is made such that n=1.

In Step S33, when the $n^{th}$ child node is present in the node (yes in S33), the processing is transferred to Step S34. When the $n^{th}$ child node is not present in the node (no in S33), the processing is transferred to Step S36.

In Step S34, on the $n^{th}$ child node, the chart B itself is performed in a recursive manner.

In Step S35, n is incremented by 1. In other words, the increment is performed such that n=n+1, and the processing is returned to Step S33.

In Step S36, the variable n is popped by 1, and the flow of the chart B is completed.

Figure 17:
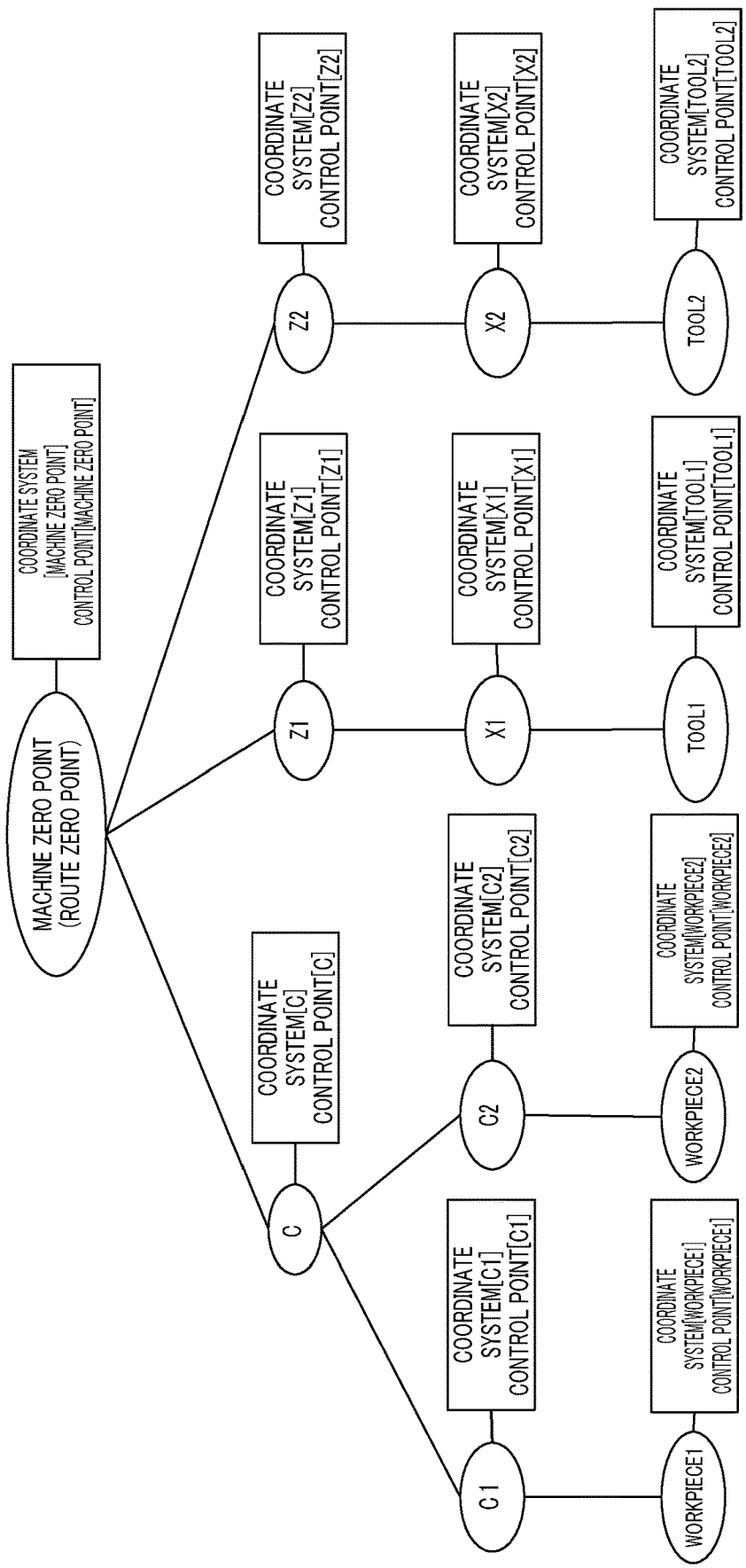
FIG. 17 is a diagram showing an example of the machine configuration tree into which the coordinate systems and the control points are inserted in the embodiment of the present invention.

By the method described above, the control point coordinate system insertion portion 113 inserts, as nodes, the control points and the coordinate systems into the individual nodes of the graph in the machine configuration. Although in the above description, the example where the control points and the coordinate systems are added as nodes is described, an embodiment is also possible in which as shown in FIG. 17, the control point coordinate system insertion portion 113 makes the individual nodes of the graph in the machine configuration have the control points and the coordinate systems as information.

7. Calculation of Transformation Information

As described above, the transformation information calculation portion 115 calculates transformation information for calculating the position and/or posture of each node. The transformation information includes, as a variable, a coordinate value of each axis indicating the movement of the node on the machine configuration tree using the coordinate values of each axis based on the machine configuration tree generated by the machine configuration management device 100. A method of calculating the transformation information will be described in detail with reference to FIGS. 18 and 19.

Figure 18:
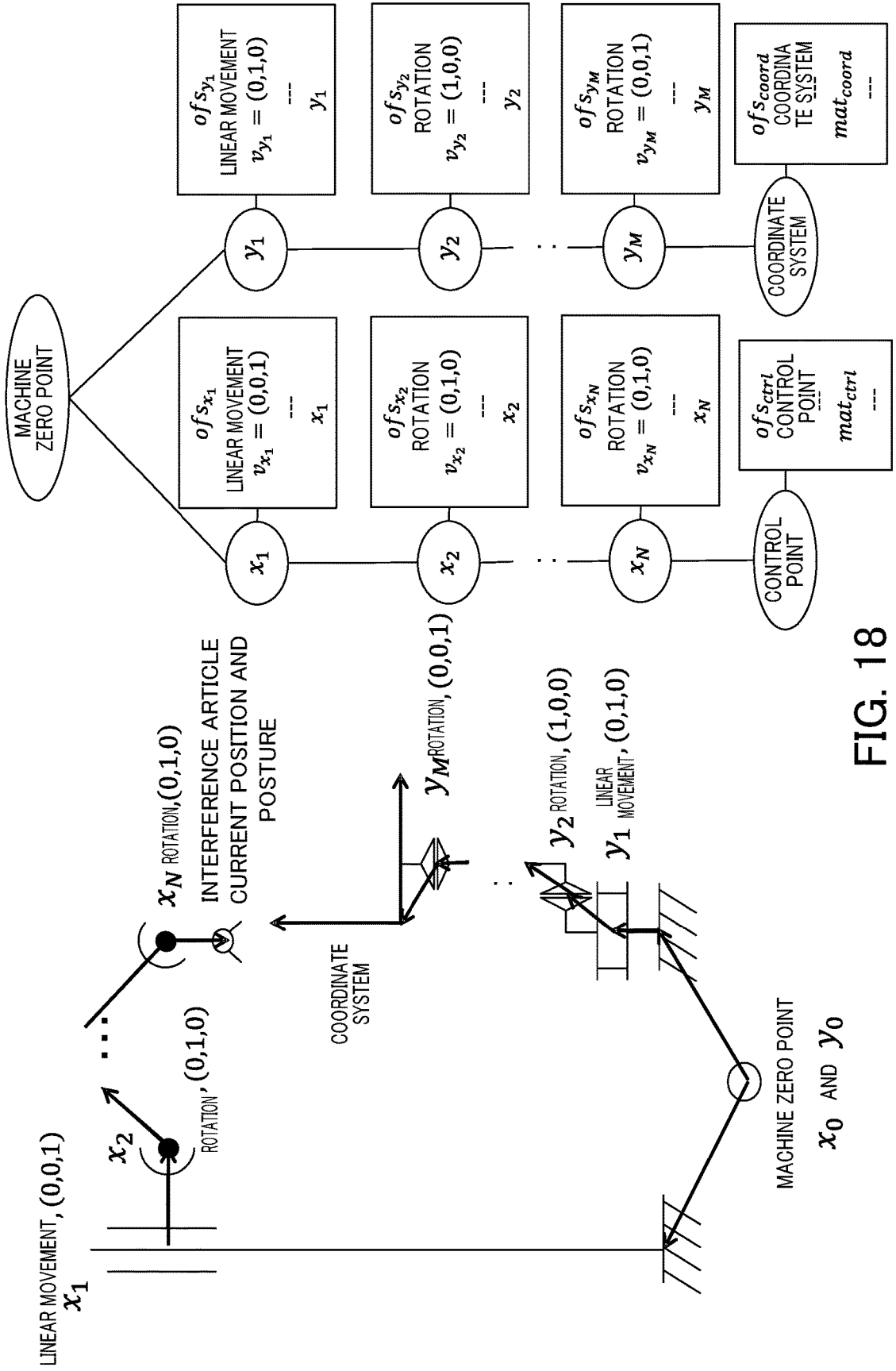
FIG. 18 is a diagram showing an example of information used when transformation information is generated in the embodiment of the present invention.

For example, as shown in FIG. 18, it is assumed that an axis $X_2$ is set on an axis $X_1$, that an axis $X_3$ is set on the axis $X_2$, that then, N nodes are likewise continuous and that the end thereof is an axis $X_N$. Furthermore, it is assumed that the control point on the axis $X_N$ is set as a selection node. Likewise, it is assumed that an axis $y_2$ is set on an axis $y_1$, that an axis $y_3$ is set on the axis $y_2$, that then, L nodes are likewise continuous and that the end thereof is an axis $y_L$. Here, although $X_i$ and $y_j$ are the names of nodes, it is assumed that they simultaneously indicate the coordinate values of the individual nodes.

Furthermore, it is assumed that the offset, the type of node (linear line/rotation/unit/control point/coordinate system), the axis direction, the posture matrix and the coordinate value shown in FIG. 18 are given to the individual nodes.

Figure 19:
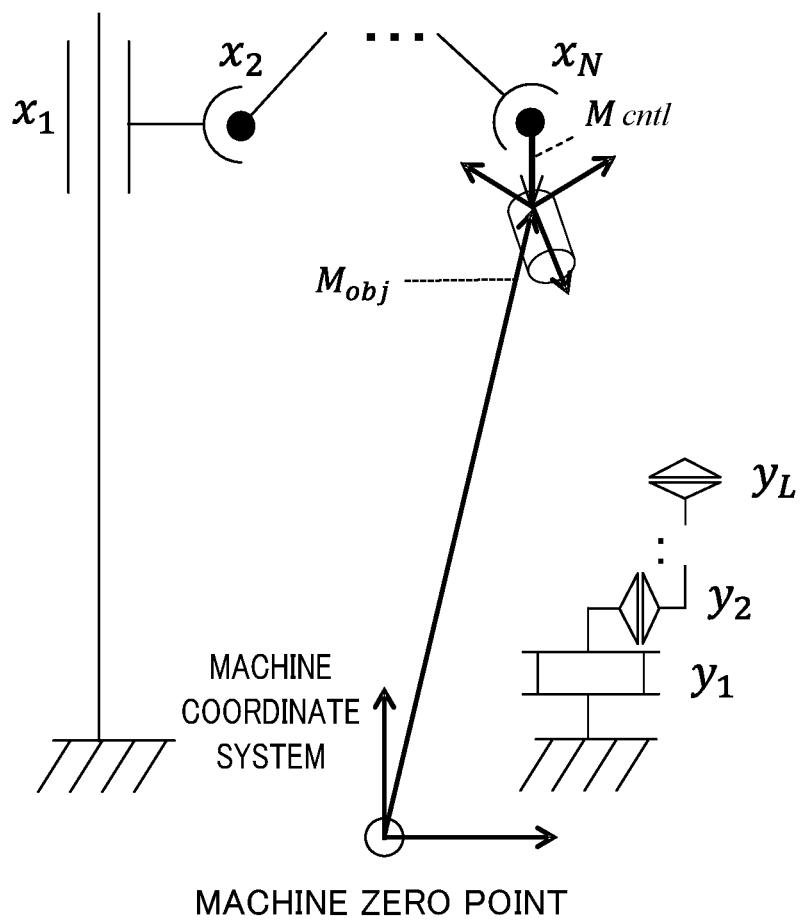
FIG. 19 is a diagram showing an example of the information used when the transformation information is generated in the embodiment of the present invention.

Here, as shown in FIG. 19, the homogeneous matrix Mob, indicating the current position and posture of the selection node with respect to the route (machine zero point) is determined by a formula below.

$$M_{obj} = (\Pi_{i=1}^{N} S_{x_i}) M_{ctrl} \text{ where } \Pi_{i=1}^{N} S_{x_i} = S_{x_1} S_{x_2} \ldots S_{x_N} \quad \text{[Formula. 3]}$$

Here, the meanings of symbols are as follows:
$S_{xi}$: homogeneous transformation matrix by individual nodes;
N: number of a series of nodes leading from the route of the machine configuration tree to the selection node; and
$M_{ctrl}$: homogeneous matrix of relative offset/posture for the parent node of the selection node which is defined according to [Formula 2] described above from an offset vector/posture matrix defined in the selection node.

The homogeneous transformation matrix $S_{xi}$ is varied depending on the type of node, and for example, in the case of a linear axis, the homogeneous transformation matrix is represented as follows.

$$S_{x_i} = \begin{pmatrix} 1 & 0 & 0 & \\ 0 & 1 & 0 & \overrightarrow{ofs_{x_i}} \\ 0 & 0 & 1 & \\ 0 & 0 & 0 & 1 \end{pmatrix} \begin{pmatrix} 1 & 0 & 0 & \\ 0 & 1 & 0 & \overrightarrow{x_i v_{x_i}} \\ 0 & 0 & 1 & \\ 0 & 0 & 0 & 1 \end{pmatrix} \quad \text{[Formula. 4]}$$

Here, the meanings of symbols are as follows:
$x_i$: coordinate value of a node $x_i$;
of $s_{xi}$: relative offset vector for the parent node of the node $x_i$; and
$v_{xi}$: movement direction vector of the node $x_i$.

In the case of a rotary axis, the homogeneous transformation matrix is represented as follows.

$$S_{x_i} = \begin{pmatrix} 1 & 0 & 0 & \\ 0 & 1 & 0 & \overrightarrow{ofs_{x_i}} \\ 0 & 0 & 1 & \\ 0 & 0 & 0 & 1 \end{pmatrix} R(x_i, v_1, v_2, v_3) \quad \text{[Formula. 5]}$$

$$R(x_i, v_1, v_2, v_3) = \begin{pmatrix} v_1^2(1-\cos x_i) + \cos x_i & v_1 v_2(1-\cos x_i) - v_3 \sin x_i & v_1 v_3(1-\cos x_i) + v_2 \sin x_i & 0 \\ v_1 v_2(1-\cos x_i) + v_3 \sin x_i & v_2^2(1-\cos x_i) + \cos x_i & v_3 v_2(1-\cos x_i) - v_1 \sin x_i & 0 \\ v_1 v_3(1-\cos x_i) - v_2 \sin x_i & v_2 v_3(1-\cos x_i) + v_1 \sin x_i & v_3^2(1-\cos x_i) + \cos x_i & 0 \\ 0 & 0 & 0 & 1 \end{pmatrix}$$

Here, the meanings of symbols are as follows;
$V_1$: first component of the rotary axis direction vector of the node $x_i$;
$V_2$: second component of the rotary axis direction vector of the node $x_i$; and
$V_3$: third component of the rotary axis direction vector of the node $x_i$.

Here, a homogeneous matrix $X_m$ representing the current positon and posture of the selection node is determined by a formula below using Mob.

$$X_m = M_{coord}^{-1} = (\Pi_{i=L}^{1} S_{x_i}^{-1}) M_{obj} \quad \text{where} \quad \Pi_{i=L}^{1} S_{x_i}^{-1} = S_{x_L}^{-1} S_{x_{L-1}}^{-1} \ldots S_{x_n}^{-1} \quad \text{[Formula. 6]}$$

Here, the meanings of symbols are as follows. L: number of a series of nodes leading from the route of the machine configuration tree to the coordinate system; and $M_{coord}$: homogeneous matrix of relative offset/posture for the parent node which is defined according to the mathematical formula of [Formula 2] described above from an offset vector/posture matrix defined in the coordinate system.

8. Interference Check Method

Figure 20:
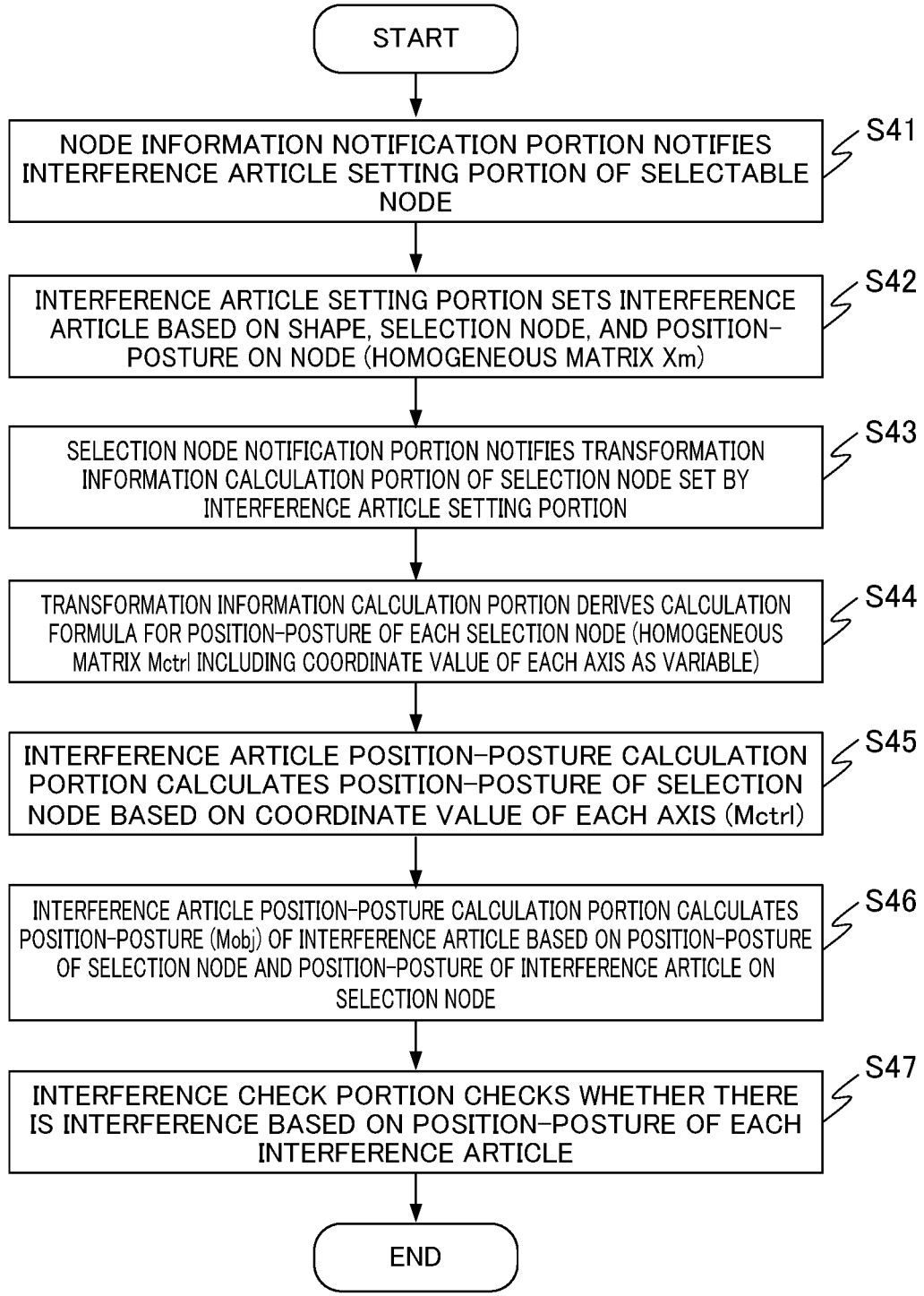
FIG. 20 is a diagram showing an operation flow of an interference check method in the embodiment of the present invention.

FIG. 20 shows the operation flow when displaying a virtual object.

In Step S41, the node information notification portion 114 notifies the interference article setting portion 211 of the interference checker 200 of a selectable node carrying an interference article.

In Step S42, the interference article setting portion 211 sets the interference article using the shape of the interference article, the selection node carrying the interference article, and the information relating to the position and posture of the interference article on the selection node.

In Step S43, the selection node notification portion 212 notifies the transformation information calculation portion 115 of the machine configuration management device 100 of the selection node set by the interference article setting portion 211.

In Step S44, the transformation information calculation portion 115 derives a homogeneous matrix including, as a variable, a coordinate value of each axis of the machine tool 300 as a calculation formula for the position and posture of each selection node.

In Step S45, the interference article position-posture calculation portion 214 calculates the position and posture of the selection node from the coordinate value of each axis.

In Step S46, the interference article position-posture calculation portion 214 calculates the position and posture of the interference article in the machine tool 300 based on the position and posture of the selection node and the position and posture of the interference article on the selection node.

In Step S47, the interference check portion 215 checks whether there is an interference based on the position and posture of each interference article.

9. Examples

Figure 21A:
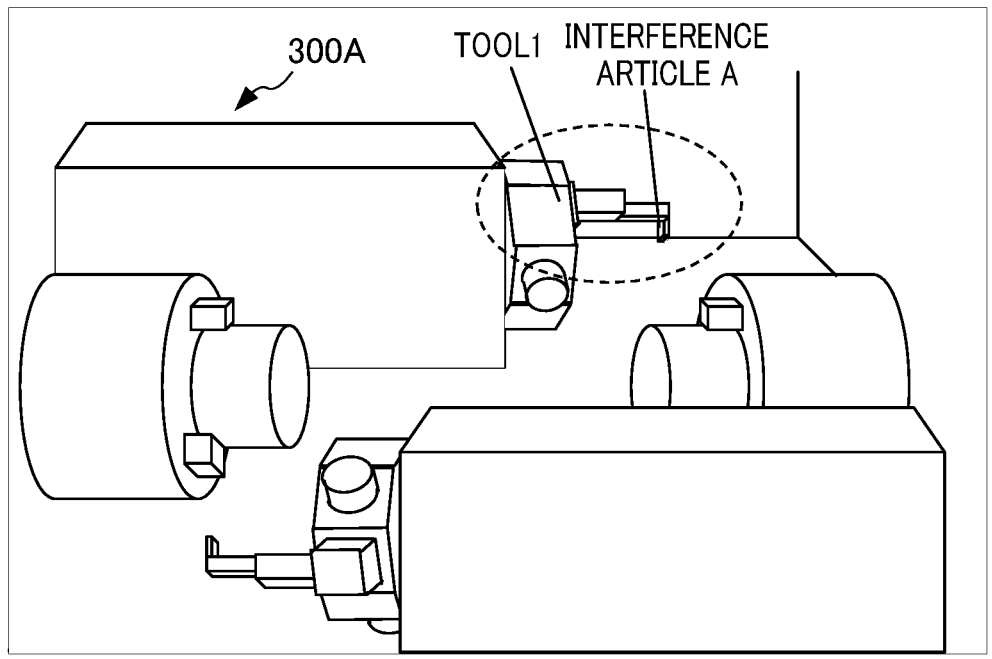
FIG. 21A is a diagram showing an example of the embodiment of the present invention.
Figure 21B:
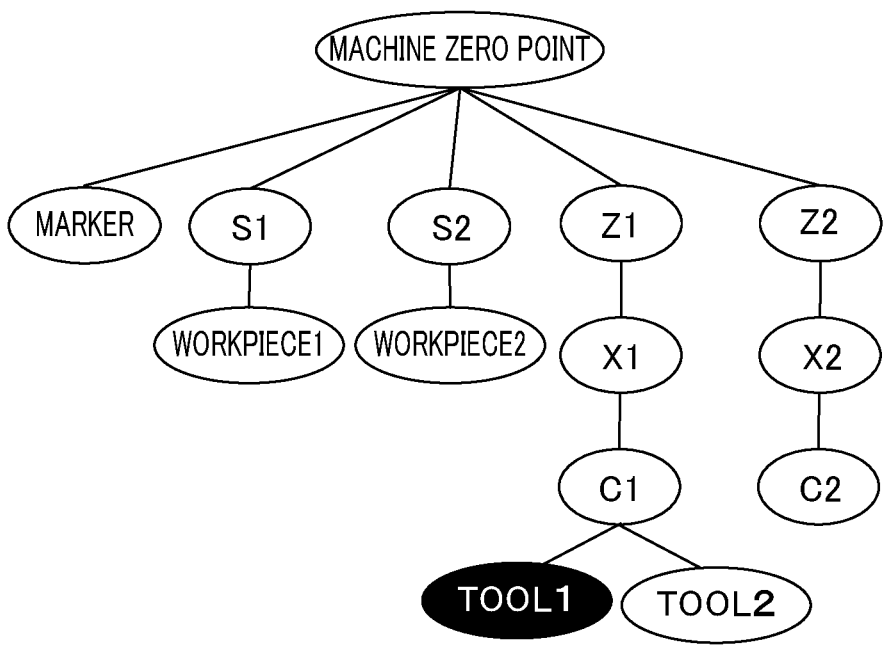
FIG. 21B is a diagram showing the example of the embodiment of the present invention.
Figure 21C:
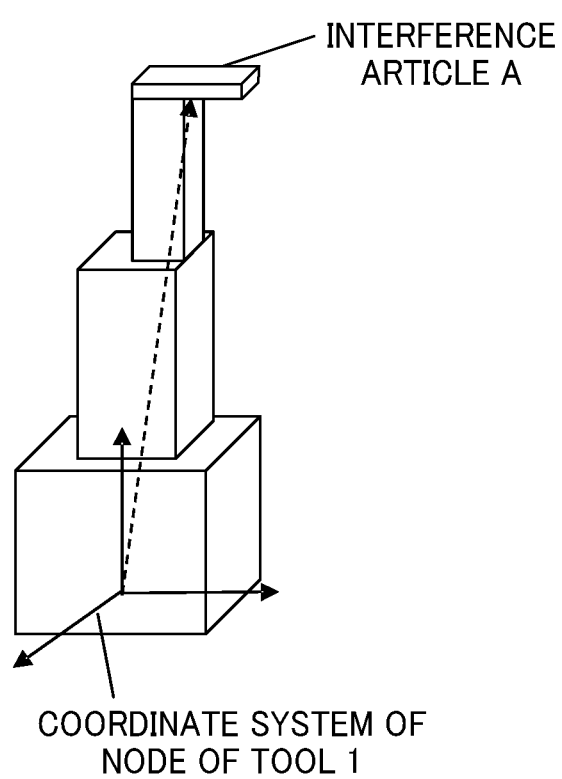
FIG. 21C is a diagram showing the example of the embodiment of the present invention.

With reference to FIGS. 21A to 21C, a description will be given of Examples of the present embodiment. FIG. 21A shows a machine tool 300A as an example of the machine tool 300 in which an interference article A is provided at a tip of a tool 1. FIG. 21B shows a machine configuration tree in which the machine tool 300A shown in FIG. 21A is displayed using a graph. FIG. 21C is an enlarged view of a node of tool 1 and the interference article A shown within a dashed line of FIG. 21A, illustrating an interference article in the coordinate system of the node of tool 1.

In FIG. 21A, the interference article A moves around together with the tool 1. Therefore, the interference article setting portion 211 selects the node of tool 1 shown in FIG. 21B as a selection node.

Furthermore, in Step S42 of FIG. 20, the interference article setting portion 211 sets the position and/or posture of the interference article A on the coordinate system of the node of tool 1 shown in FIG. 21C.

Thereafter, by executing Steps S43 to S47 of FIG. 20, the interference checker 200 checks whether there is interference by the interference article A.

10. Effects of Present Embodiment

According to the present embodiment, it is possible to enable an operation definition relating to the position of an interference article and an axis in interference check with a simple action. In particular, in the present embodiment, it is possible to enable an operation definition relating to the position of the interference article and an axis in the interference check by simply setting the selection node and calculating the position and posture of the interference article on the selection node.

11. Modification Examples

The machine configuration management device 100 may be incorporated so as to be integrated into the controller 150.

The machine configuration management device 100 may also be present on a cloud.

The machine configuration management device, the controller, the interference checker and the machine tool each can be realized by hardware, software or a combination thereof. The interference check method performed by the cooperation of the machine configuration management device, the controller, the interference checker and the machine tool can also be realized by hardware, software or a combination thereof. Here, the realization by software means that the realization is achieved by reading and performing programs with a computer.

The programs are stored with various types of non-transitory computer readable media, and can be supplied to a computer. The non-transitory computer readable media include various types of tangible storage media. Examples of the non-transitory computer readable medium include magnetic storage media (for example, a flexible disk, a magnetic tape and a hard disk drive), magneto-optical storage media (for example, a magneto-optical disk), a CD-ROM (Read Only Memory), a CD-R, a CD-R/W, semiconductor memories (for example, a mask ROM and a PROM (Programmable ROM), an EPROM (Erasable PROM), a flash ROM and a RAM (random access memory). The programs may be supplied by various types of transitory computer readable media to a computer. Examples of the transitory computer readable medium include an electrical signal, an optical signal and electromagnetic waves. The transitory computer readable medium can supply the programs to a computer through a wired communication path such as an electrical wire and an optical wire, or a wireless communication path.

EXPLANATION OF REFERENCE NUMERALS 10 control system
100 machine configuration management device
110 control portion
111 graph generation portion
112 node addition portion
113 control point coordinate system insertion portion
114 node information notification portion
115 transformation information calculation portion
116 transformation information notification portion
120 storage portion
150 controller
160 control portion
161 coordinate information notification portion
162 servomotor control portion
200 interference checker
211 interference article setting portion
212 selection node notification portion
213 coordinate information transformation portion
214 interference article position-posture calculation portion
215 interference check portion
220 storage portion
300 machine tool

What is claimed is:

1. A control system comprising:

a controller configured to control an industrial machine as a control target;

one or more memories configured to store one or more programs; and one or more processors configured to execute the one or more programs and control the control system to:

express a machine constituent element constituting the industrial machine as a node in a graphical form; and perform an interference check between a plurality of machine constituent elements, each of which constitutes the industrial machine as a node in a graphical form, identify a selectable node as a selection node including one of said plurality of machine constituent elements as an interference article, and notify of node information relating to the selectable node identified, acquire the node information, and set the interference article based on a shape, the selection node, and a position and/or posture on a node, acquire information relating to the interference article that has been set, and derive a calculation formula for a position and/or posture of the selection node, calculate the position and/or posture of the selection node based on a coordinate value of each axis of the industrial machine, and calculate the position and/or posture of the interference article in the industrial machine based on the position and/or posture of the selection node and the position and/or posture on the selection node of the interference article, and check whether there is an interference based on the position and/or posture of the interference article in the industrial machine.

2. The control system according to claim 1, wherein at least one of the one or more processors is incorporated so as to be integrated into the controller.

* * * * *